United States Patent [19]
DeStefano

[11] Patent Number: 6,075,531
[45] Date of Patent: Jun. 13, 2000

[54] COMPUTER SYSTEM AND METHOD OF MANIPULATING MULTIPLE GRAPHICAL USER INTERFACE COMPONENTS ON A COMPUTER DISPLAY WITH A PROXIMITY POINTER

[75] Inventor: George Francis DeStefano, Rochester, Minn.

[73] Assignee: International Business Machines Corporation, Armonk, N.Y.

[21] Appl. No.: 08/990,304

[22] Filed: Dec. 15, 1997

[51] Int. Cl.[7] .................................................. G06F 3/14
[52] U.S. Cl. ..................... 345/340; 345/342; 345/356; 345/145
[58] Field of Search .................. 345/340, 342, 345/145, 343, 356

[56] References Cited

U.S. PATENT DOCUMENTS

| | | | |
|---|---|---|---|
| 4,663,616 | 5/1987 | Himelstein | 340/724 |
| 4,860,218 | 8/1989 | Sleator | 364/518 |
| 4,868,765 | 9/1989 | Diefendorff | 364/521 |
| 4,964,077 | 10/1990 | Eisen et al. | 364/900 |
| 5,122,972 | 6/1992 | Richards et al. | 395/157 |
| 5,186,629 | 2/1993 | Rohen | 434/114 |
| 5,301,301 | 4/1994 | Kodosky et al. | 395/500 |
| 5,335,320 | 8/1994 | Iwata et al. | 395/155 |
| 5,361,361 | 11/1994 | Hickman et al. | 395/700 |
| 5,363,482 | 11/1994 | Victor et al. | 395/157 |
| 5,416,903 | 5/1995 | Malcolm | 395/155 |
| 5,461,399 | 10/1995 | Cragun | 345/145 |
| 5,483,632 | 1/1996 | Kuwamoto et al. | 395/156 |
| 5,506,937 | 4/1996 | Ford et al. | 395/12 |
| 5,528,744 | 6/1996 | Vaughton | 395/157 |
| 5,610,828 | 3/1997 | Kodosky et al. | 364/489 |
| 5,615,326 | 3/1997 | Orton et al. | 345/356 |
| 5,617,114 | 4/1997 | Bier et al. | 345/113 |
| 5,621,874 | 4/1997 | Lucas et al. | 695/761 |
| 5,644,740 | 7/1997 | Kiuchi | 395/357 |
| 5,694,561 | 12/1997 | Malamud et al. | 345/342 |
| 5,751,283 | 5/1998 | Smith | 345/342 |
| 5,760,772 | 6/1998 | Austine | 345/342 |
| 5,771,042 | 6/1998 | Santos-Gomez | 345/346 |
| 5,796,402 | 8/1998 | Taylor | 345/342 |
| 5,802,514 | 9/1998 | Huber | 707/4 |
| 5,808,610 | 9/1998 | Benson et al. | 345/346 |
| 5,812,804 | 9/1998 | Bates et al. | 395/342 |
| 5,815,151 | 9/1998 | Argiolas | 345/342 |
| 5,819,055 | 10/1998 | MacLean et al. | 345/342 |
| 5,835,088 | 11/1998 | Jaskelainen, Jr. | 345/343 |
| 5,856,826 | 1/1999 | Craycroft | 345/346 |
| 5,874,962 | 2/1999 | Judicibus et al. | 345/342 |
| 5,874,964 | 2/1999 | Gille | 345/356 |
| 5,880,733 | 3/1999 | Horvitz et al. | 345/355 |
| 5,912,668 | 6/1999 | Sciammarella et al. | 345/348 |
| 5,920,314 | 7/1999 | Maesano et al. | 345/340 |
| 5,937,400 | 8/1999 | Au | 706/55 |

OTHER PUBLICATIONS

Michelle Shaw, *Microsoft® Office 6–in–1*, Que Corporation, (1994), pp. 10–11, 14–15, 40, and 42–43.

Elder et al., "Architecture for Platform and Presentation Independent User Interface for Applications", *IBM® Technical Disclosure Bulletin*, vol. 38, No. 1, pp. 297–302, (Jan. 1995).

Brittan, David, "MIT Reporter", *Technology Review*, pp. 12–14, (Feb. 1997).

*Primary Examiner*—Raymond J. Bayerl
*Assistant Examiner*—Thomas T. Nguyen
*Attorney, Agent, or Firm*—Scott Stinebruner

[57] ABSTRACT

A computer system and method manipulate multiple windows or similar graphical user interface components using a proximity pointer that concurrently manipulates windows that are at least partially disposed within a proximity range located proximate the pointer. Windows may be concurrently moved or resized in response to movement of the pointer. In the alternative, windows may be concurrently moved or resized either inwardly or outwardly along radial lines extending from a common origin located proximate the pointer.

47 Claims, 15 Drawing Sheets

COMPUTER SYSTEM AND METHOD OF MANIPULATING MULTIPLE GRAPHICAL USER INTERFACE COMPONENTS ON A COMPUTER DISPLAY WITH A PROXIMITY POINTER

CROSS-REFERENCE TO RELATED APPLICATIONS

This application is related to the following co-pending application, which was filed on even date herewith by George Francis DeStefano: U.S. Ser. No. 08/990,370, entitled "COMPUTER SYSTEM AND METHOD OF MANIPULATING A WINDOW ON A COMPUTER DISPLAY THROUGH COLLISION WITH A POINTER" (RO997-005). This application is hereby incorporated by reference herein.

FIELD OF THE INVENTION

The invention is generally related to computer systems and graphical user interface environments therefor. More particularly, the invention is related to user manipulation of windows and other user interface controls in a graphical user interface environment.

BACKGROUND OF THE INVENTION

As computers have become more complex and powerful, the manner in which end users or operators interface with computers has grown increasingly important. Early computers relied on switches, lights, and/or punch cards that required an end user to interact essentially in the computers' native binary languages. Eventually, video displays were developed that enabled end users to interact with computers through textual information and commands. Another significant step in this evolution was the development of graphical user interfaces (GUIs), which permitted end users to interact with computers through the more intuitive operations of "pointing and clicking" on graphical display elements with a pointer controlled by a mouse or other user interface device.

Information is often presented to an end user in a GUI environment using a graphical user interface component known as a window. A window may sometimes be used to display a relatively large document with only a portion of the document shown at any given time. Typically, scroll bar controls on the window may then be used to navigate through the document so that a user can view different portions of the document. In addition, using other controls on the window, a user may perform various operations on the window, including moving the window to another position on the display, resizing the window by moving one or more segments of its boundary, minimizing the window into an icon representation, maximizing the window to occupy the entire display, etc. Other windows, such as dialog boxes and the like, may omit one or more of the above-described controls.

Each computer software application executing in a GUI environment is typically allocated one or more windows to present information to and/or receive input from a user. Moreover, a number of computer systems provide the ability to multitask—that is, to execute more than one computer software application at the same time—such that windows from multiple applications may be displayed on a computer display simultaneously. As a result, a large number of windows may be displayed on a computer system at any given time.

Multiple windows are typically displayed in a computer system in an overlapping fashion, with the top window designated an active window associated with the computer software application to which user input will be directed, and with each window represented by a level indicating how "deep" each window is relative to other windows on the display. In addition, any overlapped portions of inactive windows are hidden from the user. Inactive windows are then typically activated and brought to the top by pointing and clicking on the windows (although other possible user inputs may also be used).

Users often need to access multiple windows quickly and frequently when performing computer tasks. For example, due to schedule pressures, a user may be required to work on multiple tasks concurrently, e.g., by handling certain tasks while waiting for the results of other tasks from a computer. However, when a large number of windows are displayed at the same time on a computer display, it can often become difficult to interact with each window due to the limited space available on the computer display. Windows can become fully hidden behind other windows when the other windows are activated by pointing and clicking, and thereafter are not accessible to a user without a great deal of user interaction. Operations such as moving and resizing are also often burdensome since the controls to perform such actions are defined at specific locations on the windows, and since each window typically must be manipulated individually. Consequently, a user may spend an inordinate amount of time manipulating windows, rather than performing the computer tasks at hand.

An additional concern is raised in that, when working on multiple tasks at once, a user may have difficulty in maintaining the relationships between tasks and windows. Switching between various windows and tasks can be confusing and can cause a user to lose their focus.

Therefore, a significant need exists for an improved manner of manipulating multiple graphical user interface components such as windows and the like in a graphical user interface environment.

SUMMARY OF THE INVENTION

The invention addresses these and other problems associated with the prior art in providing a computer system and method in which multiple windows or similar graphical user interface components are manipulated by a proximity pointer that concurrently manipulates windows and the like that are at least partially disposed within a proximity range located proximate the pointer. Consistent with one aspect of the invention, windows and the like may be concurrently moved or resized in response to movement of the pointer. Consistent with another aspect of the invention, windows and the like may be concurrently moved or resized either inwardly or outwardly relative to a common origin located proximate the pointer.

In either manner, a user is permitted to more quickly and easily move and/or resize multiple components in a more coordinated fashion.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

DETAILED DESCRIPTION

Figure 1:
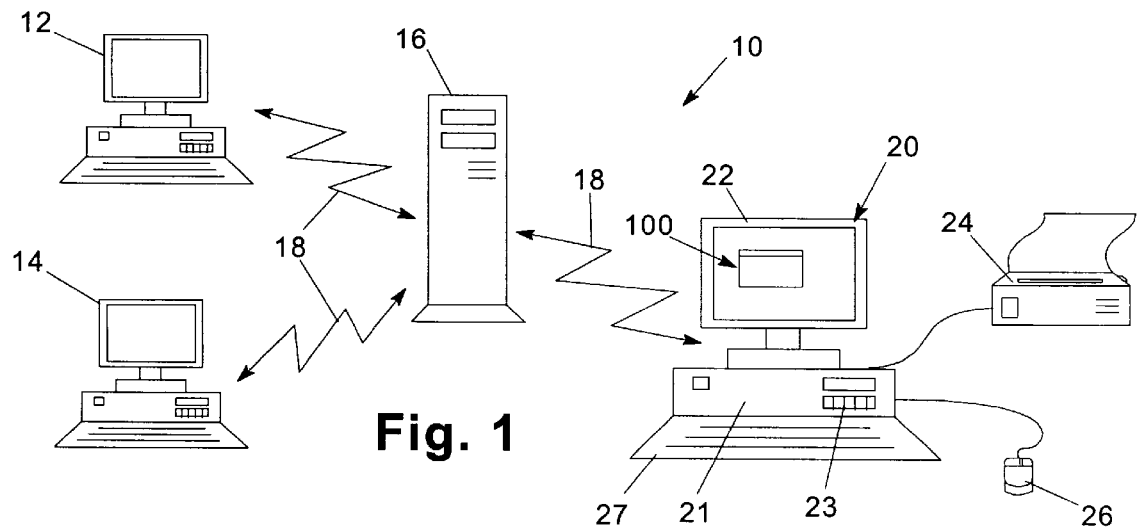
FIG. 1 is a block diagram of a computer system consistent with the invention.

The embodiments of the invention described hereinafter manipulate graphical user interface components such as windows and the like in response to their proximity to a user-manipulated pointer. Manipulation of a graphical user interface component is principally illustrated herein in terms of moving or resizing the component, or of changing the relative level thereof within the hierarchy of components on a display. However, it should be appreciated that manipulation of a graphical user interface component may include other activities consistent with the invention. For example, at least for window graphical user interface components, manipulation may include operations such as closing a window, minimizing a window, or maximizing a window. In addition, manipulation may also include other activities that are specific to the particular computer software application within which the proximity manipulation feature is implemented. Moreover, among other variations, manipulation may also include minimizing all affected components into a single icon, menu entry, etc., such that restoring the minimized icon or entry restores all of the affected components. This latter instance would be similar in many respects to minimizing an application having multiple open windows into a single icon, which is a type of user interface feature that is well known in the art.

As used herein, a window may include any number of graphical user interface components in which information is displayed to a user and/or from which user input is received. A window includes a boundary formed of one or more boundary segments. Moreover, if more than one boundary segment forms a boundary, at least one corner will also be defined proximate the intersection of two boundary segments. Typically, a window boundary is defined by four boundary segments arranged into a rectangular configuration and defining four corners therebetween, although other shapes (linear or curved), numbers and arrangements of boundary segments may be used in the alternative. A window may or may not include scroll bars, and further, may be defined as a modal (e.g., as with a dialog box) or modeless. In addition, other graphical user interface components may be manipulated in the same manner consistent with the invention, e.g., icons; desktop publishing design elements such as text frames, tables, images, artwork, etc.; graphical/artwork elements such as lines, boxes, circles, outlines, etc. (e.g., in painting, drawing, illustration and computer aided design (CAD) applications), among others.

A pointer may be represented by any number of conventional cursor designs, including an arrow, a cross-hair, or other graphical representation. In addition, it should be appreciated that a unique pointer may be used when in a proximity mode in which the proximity manipulation feature is enabled so that a user is notified that the mode is enabled. Furthermore, resizing and moving modes may also be distinguished via separate pointer representations.

Prior to describing preferred embodiments of the invention, a brief discussion of exemplary hardware and software environments will be presented.

Hardware Environment

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22; storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

Computer display 22 may include any known manner of visually presenting information to a user. For example, computer display 22 may be a video monitor, e.g., a cathode-ray tube (CRT), a liquid crystal display (LCD), or a projection display, among others. In addition, other types of computer displays, including two dimensional displays that simulate three dimensions (e.g., virtual reality headsets), as well as three-dimensional displays such as holographic tanks and the like, may also be used.

User input may also be received from other known user input devices. For example, control of a pointer on a display may be handled by a trackball, a joystick, a light pen, a touch sensitive pad or display, a digitizing tablet, and a keyboard, among others. In addition, many of such devices include one or more user controls such as buttons, thumb wheels, sliders and the like. Moreover, voice and/or image recognition may be used to permit a user to provide voice commands and/or gestures to provide user input to a computer system. Other user interface devices may also be used in the alternative.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Environment

Figure 2:
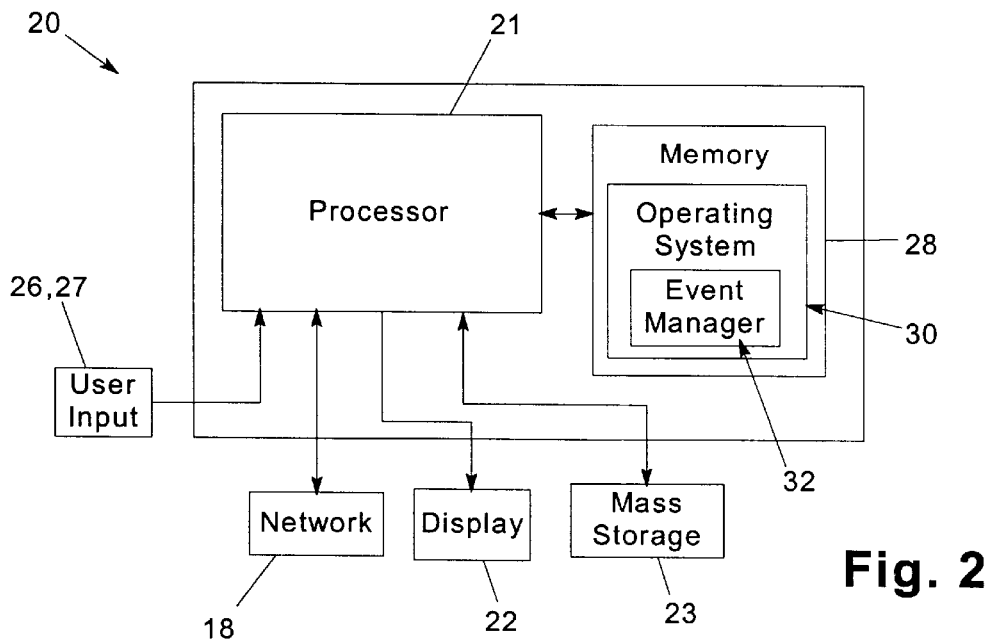
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

Computer system 10 is typically under the control of an operating system 30, a component of which is an event manager, which is illustrated at 32 and is shown as resident in memory 28. Event manager 32 generally provides in conjunction with a display manager (not shown) an event-driven graphical user interface (GUI) environment for handling the display of information to, and the receipt of input from, a user. However, it should be appreciated that routines consistent with the invention may also find use in other processes than an event manager. For example, routines consistent with the invention may find use in various computer software applications that execute on top of an operating system.

It should be appreciated that the operating system 30 and event manager 32 may be stored on network 18 or mass storage 23 prior to start-up. In addition, each may have various components that are resident at different times in any of memory 28, mass storage 23, network 18, or within registers and/or caches in processor 21 (e.g., during execution thereof).

It should also be appreciated that other software environments may be utilized in the alternative.

Proximity Manipulation Windows and the Like in Response to Pointer Movement

Figure 3:
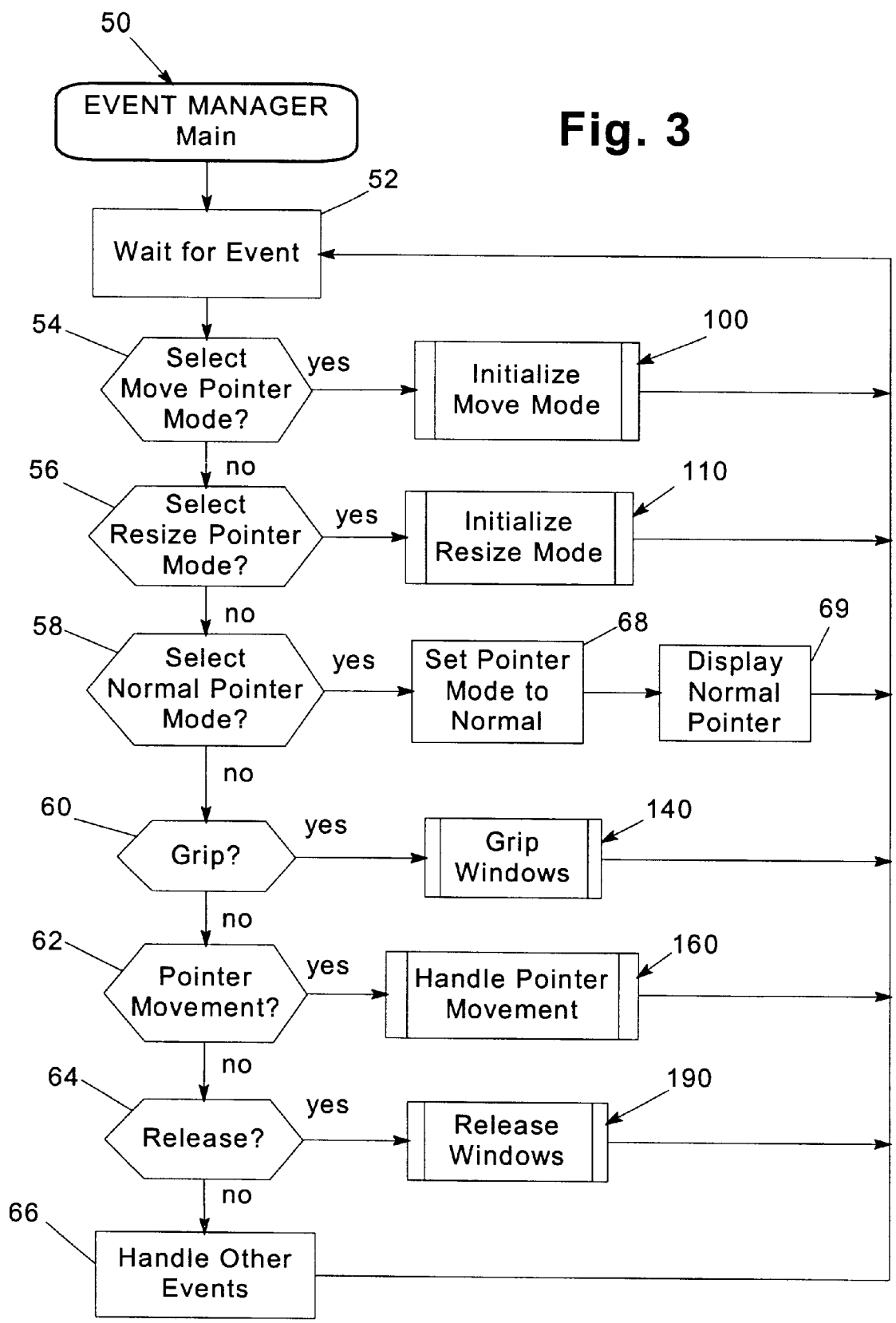
FIG. 3 is a flowchart illustrating the program flow for the main routine of an event manager consistent with the invention.

FIG. 3 illustrates an exemplary program flow for an event manager routine 50 executed by event manager 32 of FIG. 2. Routine 50 is shown implemented in an event-driven representation. However, other programming models, e.g., procedural or object-oriented models, may be used in the alternative. Moreover, the discussion hereinafter may focus on a computer system having a mouse and keyboard for providing user input to the system. It should be appreciated that the invention may be utilized with any of the other user interface devices described above, and thus the invention should not be limited to this particular hardware configuration.

Routine 50 may be considered to operate in an endless loop—typically as a dedicated process running in the background of operating system 30. As is well-known in the art, routine 50 waits for events at block 52 and passes such events to appropriate handling routines. A number of such events consistent with the invention are detected at blocks 54, 56, 58, 60, 62 and 64. Also shown in FIG. 3 is a block 66 that handles the multitude of other types of events generated in the computer system, but which are not relevant to a complete understanding of the invention.

Generally, in the embodiment described herein, a pointer may be considered to operate in one of at least three mutually exclusive modes. A first, normal mode represents the conventional operation of a user controlled pointer in a GUI environment. A second, "move" mode represents a mode in which, after activation of specific user input, windows within a grip span of an origin point defined by the user may be cooperatively moved in response to movement of the pointer or other user input. A third, "resize" mode represents a mode in which, after activation of specific user input, windows within a grip span of an origin point defined by the user may be cooperatively resized in response to movement of the pointer or other user input.

Selection of one of the three pointer modes may be performed in any number of manners known in the art. For example, selection of a mode may be performed via pull-down or pop-up menus, via check boxes or radio buttons, via toolbar buttons, or by using specific keystroke and/or mouse button combinations. Moreover, other known user interface controls may be used to toggle between the available modes. In addition, the pointer mode may be set, and/or a default pointer mode may be defined, via a preferences or options dialog box. Other manners of selecting or de-selecting a specific mode on a computer system may be used in the alternative.

As shown at block 54, selection of the move pointer mode may be detected by routine 50. If such an event is received, control is passed to initialize move mode routine 100 to place the pointer in the move mode. Similarly, as shown at block 56, routine 50 may also receive an event to select the resize pointer mode, which is handled by initialize resize mode routine 110. It should be appreciated that any of the above-described manners of selection of the move and resize pointer modes may initiate such events consistent with the invention.

Selection of the normal pointer mode is detected at block 58. In response to such an event, control is passed to block 68 to set the pointer mode to the normal mode, and then to block 69 to display a normal (non-proximity) pointer. Display of the pointer may also entail refreshing the display in a manner well known in the art.

In the embodiment described herein, once the pointer mode is set to either of the move or resize pointer modes, proximity movement or resizing is generally performed by a user by initiating a grip event and moving the pointer as desired. The actual movement or resizing of windows is performed in response to detection of movement of the pointer. Proximity movement or resizing is terminated in response to a release event.

In the embodiment described herein, the grip and release events are respectively initiated by depressing and releasing one or more mouse buttons (with or without cooperative keystroke combinations). Moreover, through depression of different mouse buttons or combinations of the same, operation of the proximity manipulation feature may be customized between several available options that are discussed in greater detail below. It should be appreciated, however, that the user interface mechanisms by which the different modes and features of the invention are activated may vary from those described herein. Thus, the invention should not be limited as such.

As shown at blocks 60, 62 and 64, the grip, pointer movement and release events are received by routine 50 for handling by appropriate routines. In particular, the grip event is handled by grip windows routine 140, the pointer movement event is handled by handle pointer movement routine 160, and the release event is handled by release windows routine 190.

Figure 4:
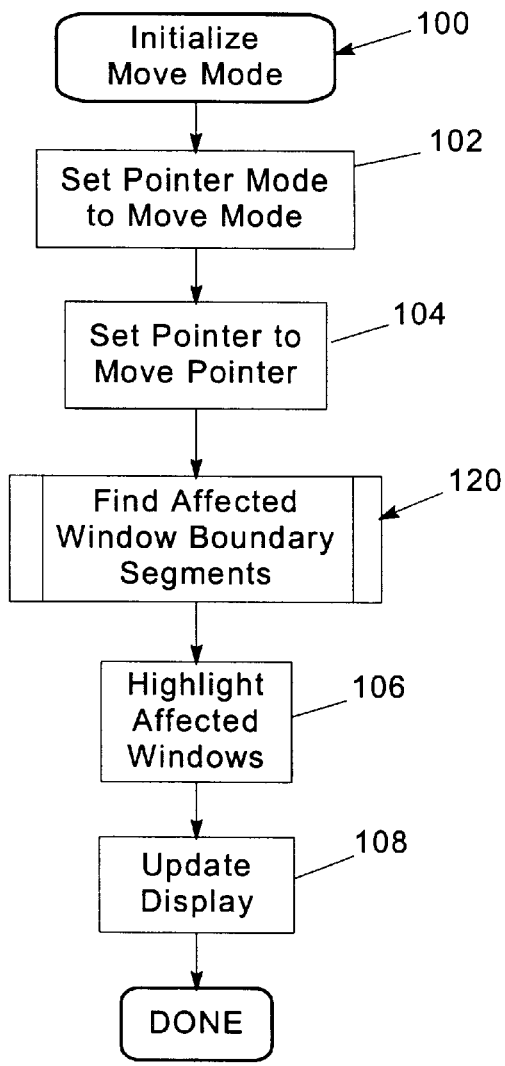
FIG. 4 is a flowchart illustrating the program flow of the initialize move mode routine of FIG. 3.

Initialize move mode routine 100 is illustrated in greater detail in FIG. 4. As discussed above, the pointer for the computer system may be set by user in one of three mutually exclusive modes. Moreover, it is desirable to utilize separate representations of the pointer in each of the different modes so that a user may readily discern the current mode for the pointer.

Accordingly, routine 100 begins at block 102 by setting the pointer mode to the "move" mode. Next, in block 104, the pointer is set to a move pointer representation.

Several different manners may be utilized to distinguish the representation of the pointer depending upon its current mode. For example, the move pointer representation may include any cursor representation that would indicate to a user when the move mode is selected. For example, a hand, arrow, grappling hook, or other like representation may be utilized to distinguish the move pointer. In addition, the current grip span of the pointer may be utilized to display the extensive proximity range of the pointer, e.g., by outlining the proximity range and/or utilizing a different shade or color within the proximity range to distinguish from other portions of the display. As one example, all of the pixels within the proximity range may be displayed with a lighter shade such that the pointer has the effect of a spotlight in highlighting the proximity range for the pointer. Further manners of distinguishing different pointer representations may be utilized in the alternative.

Once the representation of the pointer has been set, a find affected window boundary segments routine 120 is called to determine which windows, and specifically, which boundaries segments thereof, are at least partially disposed within the current proximity range for the pointer. As will be discussed in greater detail below, routine 120 returns a "gripped list" that indicates each of the windows and segments thereof that fall within the proximity range of the pointer. This information is utilized in block 106 to highlight the affected windows so that a user can discern the windows that would be affected should a grip event be initiated by the user. Highlighting of affected windows is generally performed by setting a flag in each window object such that, upon their display, a unique representation is generated for the windows to distinguish such windows from non-affected windows.

Affected windows may be highlighted in any number of manners known in the art period. For example, the boundaries of the windows may be distinguished via shade or color. In addition, the title bars of such windows may be distinguished in a similar manner. In other embodiments, specific icons may be utilized to distinguish the affected windows from the non-affected windows. Such icons may be provided, for example, within the title bars of the windows, or separate icons may be provided at each intersection of a boundary segment of a window with the perimeter of the proximity range of the pointer. Other manners of distinguishing a window or a segment thereof may be utilized consistent with the invention.

After the affected windows have been highlighted, control passes to block 108 to update the display. This has the result of refreshing the pointer to its move pointer representation, and of refreshing each affected window to display the affected status thereof. It should be appreciated that in general, updating a display, or otherwise refreshing components rendered on a display, is well known in the art.

Figure 5:
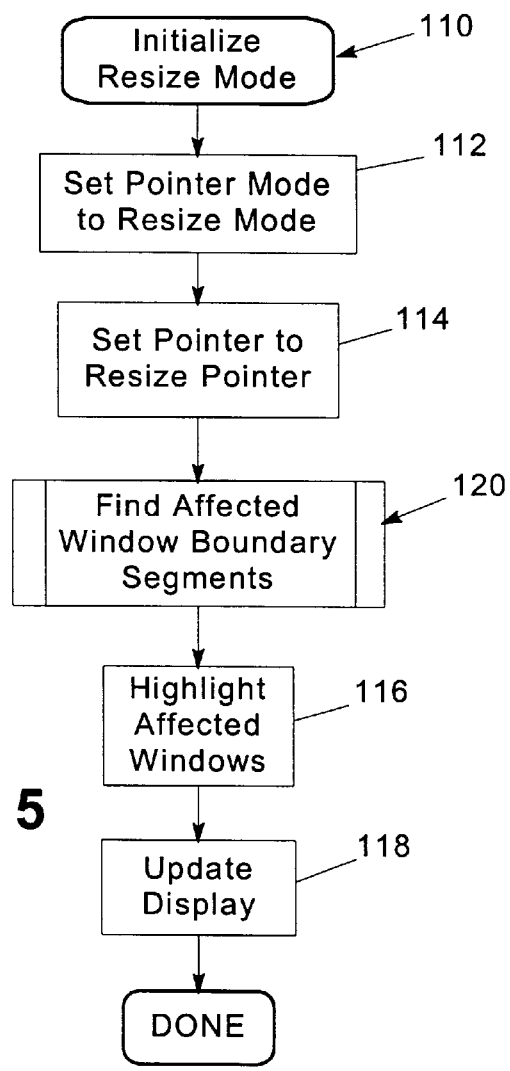
FIG. 5 is a flowchart illustrating the program flow of the initialize resize mode routine of FIG. 3.

FIG. 5 illustrates initialize resize mode routine 110 in greater detail. Routine 110 operates in substantially the same manner as routine 100 of FIG. 4, with the exception that block 112 sets the pointer mode to a "resize" mode, and block 114 sets the pointer to a "resize" pointer representation. Routine 120 is likewise called to determine the affected window boundary segments for the current proximity range of the pointer, and blocks 116 and 118 operate in the same manner as blocks 106 and 108 to highlight the affected windows and update the display.

It should be appreciated that the resize pointer representation may be the same as that of the move pointer representation. In the alternative, a different pointer representation may be utilized for the move and resize pointers such that a user may readily distinguish between the two modes.

Figure 6:
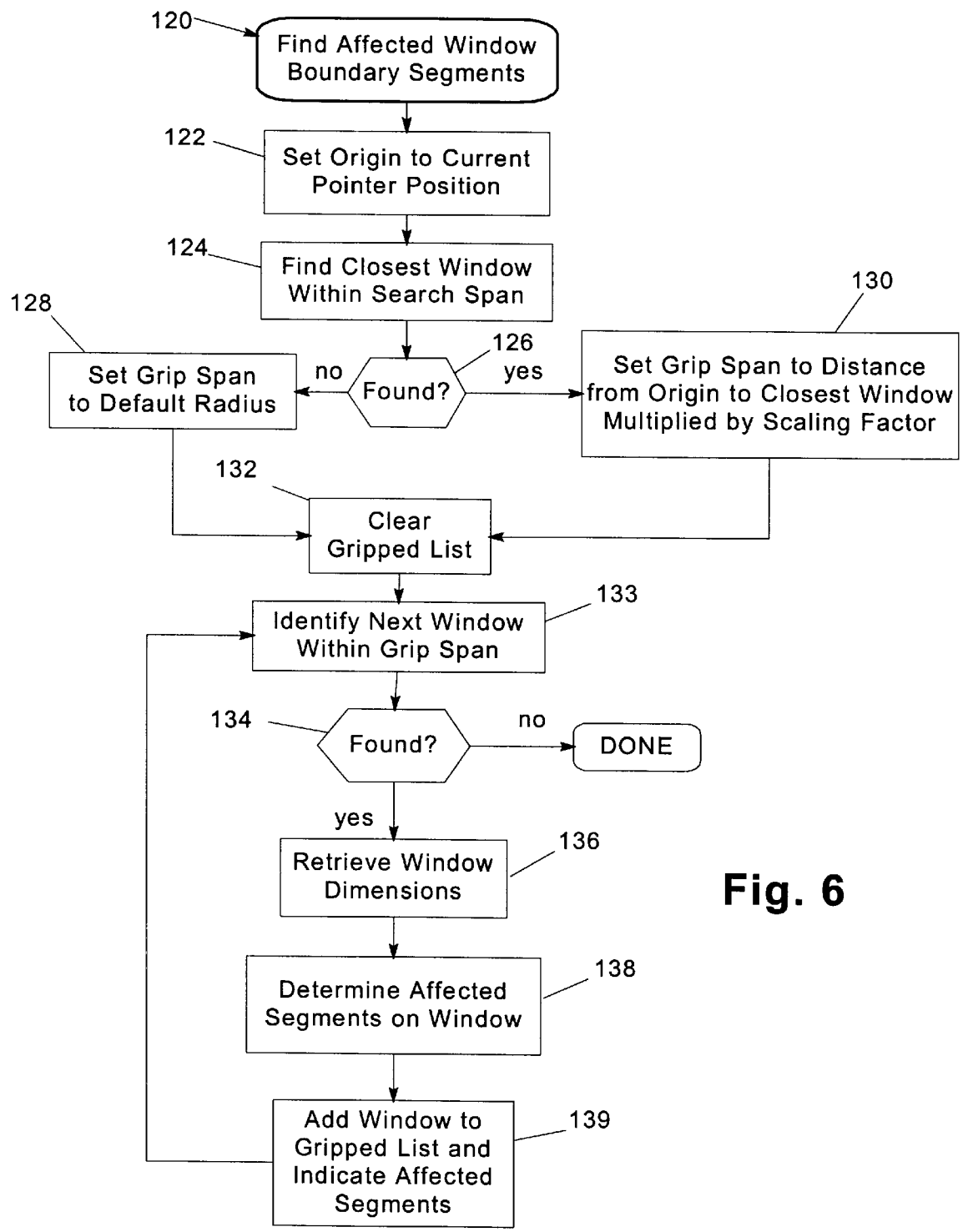
FIG. 6 is a flowchart illustrating the program flow of the find affected window boundary segments routine called in FIGS. 4, 5 and 8.

FIG. 6 illustrates routine 120 in greater detail. As discussed above, routine 120 generally locates the boundary segments of the windows that are at least partially disposed within a current proximity range.

A "proximity range" is dependant upon a "grip span" that is typically customizable by a user to modify the characteristics of the proximity range for a pointer. In its most basic configuration, the grip span, and thus the proximity range around the pointer, is represented by a circle with a predetermined radius that is centered at the current position indicated by the pointer. In this configuration, any boundary segment of a window that is at least partially disposed within this circular area is deemed to be "affected" by the pointer.

A number of additional features may be implemented in a proximity range consistent with the invention. For example, the origin of the proximity range may be defined at other positions proximate the pointer. For example, the origin of the proximity range may be set to a position on the closest window, e.g., on the closest boundary segment or in a corner defined by two boundary segments.

In addition, the radius of the proximity range may be dynamically generated based upon the closest window to the current position of the pointer. For example, in one embodiment, the radius of the proximity range is set to the distance to the closest window component multiplied by a scaling factor. The scaling factor may be fixed or variable, and may be customizable by a user. Typically, the scaling factor is greater than one such that the proximity range is essentially an annular region with an inner radius equal to the distance between the pointer and the closest window, and an outer radius set by the scaling factor. The scaling factor may also be variable depending upon the distance to the closest window, such that a comparatively greater or lesser area is analyzed depending upon the closeness of the nearest window.

In addition, geometric shapes other than a circle may be utilized for the proximity range. For example, as will be discussed in greater detail below, a proximity range may be focused in a predetermined direction that is customizable by a user. In one embodiment, an ellipse focused to the left or the right of the pointer may be utilized to focus a proximity range to either side of the pointer through the use of specific key user input such as a keystroke or a mouse button depression.

Another particularly desirable optional configuration for the proximity range utilizes a third dimension, where only windows within a predetermined range of levels may be deemed to be affected by a proximity pointer. Windows may be distinguished on different levels in a number of manners consistent with the invention. For example, each window may be assigned a unique level, with the top level window being designated the "active" window for which user input is currently being received. The proximity range may be limited to windows on the top level, or any other combination or range of levels.

In the alternative, multiple windows may share a current level. For example, a level of a window may be determined by the number of other windows that overlap the window. As another alternative, windows owned by a common application may be assigned the same level, with the groups of windows for unique applications arranged on unique levels.

One particularly desirable manner of distinguishing windows on different levels is to define the level of a selected window as one plus the level for the lowest-level window that overlaps the selected window (assuming that the level number increases as a window is placed lower in the window hierarchy). In addition, any selected window having no other overlapping windows may be defined as a top level window (e.g., with a level number of 0 or 1). It should also be appreciated that level numbering may also increase as a window is placed higher in a window hierarchy, whereby the above-described level determination for a selected window would generally operate by subtracting one from the level of the lowest-level window overlapping the selected window.

As another alternative, a separate geometric shape and/or radius may be utilized for windows in different levels. This would permit, for example, a proximity range to extend further for windows located at higher levels than for windows of lower levels. Other modifications will be apparent to one of ordinary skill in the art.

Routine 120, as illustrated in FIG. 6, begins at block 122 by setting the origin of the proximity range to the current position of the pointer. Next, in block 124, a "search span" is searched to find the closest window to the pointer. The search span is typically a circle centered at the origin and extending at a predetermined radius.

Block 126 is executed to determine whether such a window was found. If not, control is passed to block 128 to set the grip span to a default radius. If, however, a window is found, block 126 passes control to block 130 to dynamically set the grip span. This is performed by determining the distance from the origin to the closest point on the closest window found in block 124, then multiplying the distance by a scaling factor that is set by the user. Each of these steps may be performed by mathematical operations known in the art.

In either event, control is passed to block 132 after the radius of the grip span is set. Block 132 clears a gripped list that is maintained by the computer system to store information pertaining to all of the affected windows for the current proximity range defined at the current position of the pointer. Any number of data structures may be utilized to implement the gripped list, e.g., a list of records, with each record related to one affected window.

After the gripped list is cleared, block 133 is executed to identify the next window on the display that is at least partially within the grip span. Identification of a window may be performed, for example, by sequencing through each window in the display until a window is found that at least partially overlaps the proximity range defined by the current grip span. It should be appreciated that this determination is also a routine mathematical calculation based upon the known coordinates of a window and the proximity range. In the preferred embodiment, an affected window is limited to a window that has a boundary segment that is at least partially disposed within the proximity range. However, in another embodiment it may be desirable to also include windows that wholly encompass the proximity range, but that do not have boundary segments intersecting the same. Similarly, it may also be desirable to include windows that are wholly encompassed by the proximity range.

Next, decision block 134 is executed, and if another window in the display is found to be at least partially disposed within the grip span, control is passed to block 136 to retrieve the dimensions of the window. Then, in block 138, the affected boundary segments (i.e., the intersected boundary segments) in that window. It should be appreciated that blocks 136, 138 may not be separately required as the calculation of such information may inherently be performed in some implementations of block 133.

Based upon the above information, a record in the gripped list is created for the window in block 139. Within this record, the affected boundary segments are stored. Control is then returned to block 133 to identify the next window within the grip span.

Each window in the display is subsequently analyzed in the manner described above until such time as no additional windows are found. Block 134 then exits routine 120. The gripped list then includes records for each affected window in the display.

Figure 7:
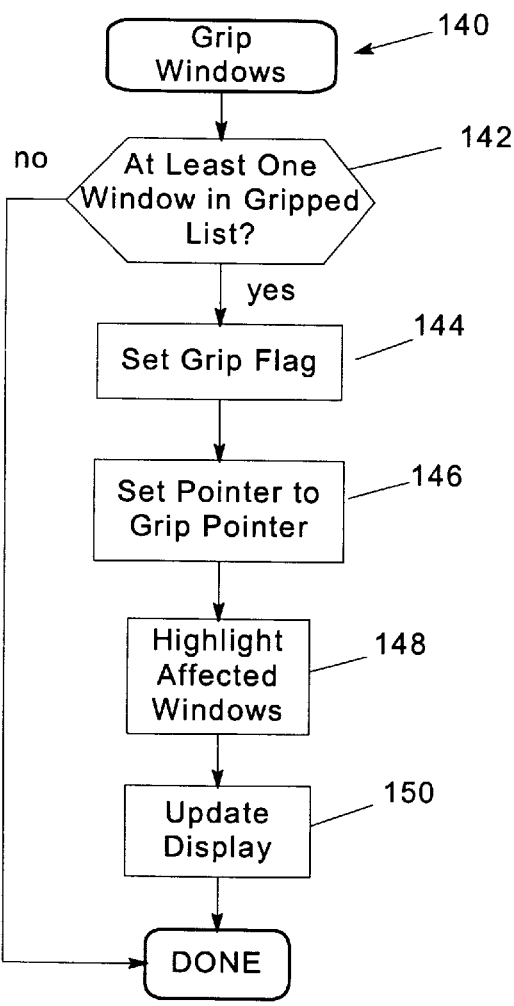
FIG. 7 is a flowchart illustrating the program flow of the grip windows routine of FIG. 3.

Grip windows routine 140 is illustrated in greater detail in FIG. 7. As discussed above, routine 140 is initiated in response to a user generating a grip event, e.g., by depressing one or more mouse buttons while in the move or resize mode.

Routine 140 begins at block 142 by determining whether at least one window is found in the gripped list. If not, routine 140 terminates immediately, as there are no windows within the current proximity range to manipulate.

If, however, a window exists in the gripped list, control is passed to block 144 to set a "grip" flag, thereby indicating that the grip event has been initiated. Next, in block 146, the pointer is set to a "grip" pointer representation that is preferably distinct from either of the move or resize pointer representations. In the alternative, the grip pointer may have the same representation as any of the other pointers. However, by distinguishing the grip pointer, a user is readily permitted to discern when the grip mode has been activated. Next, in block 148, the affected windows are highlighted in any of the manners noted above. Next, the display is updated in block 150, thereby refreshing the affected windows and refreshing the pointer to indicate that the system has been placed in the grip mode. Routine 140 then terminates.

Figure 8:
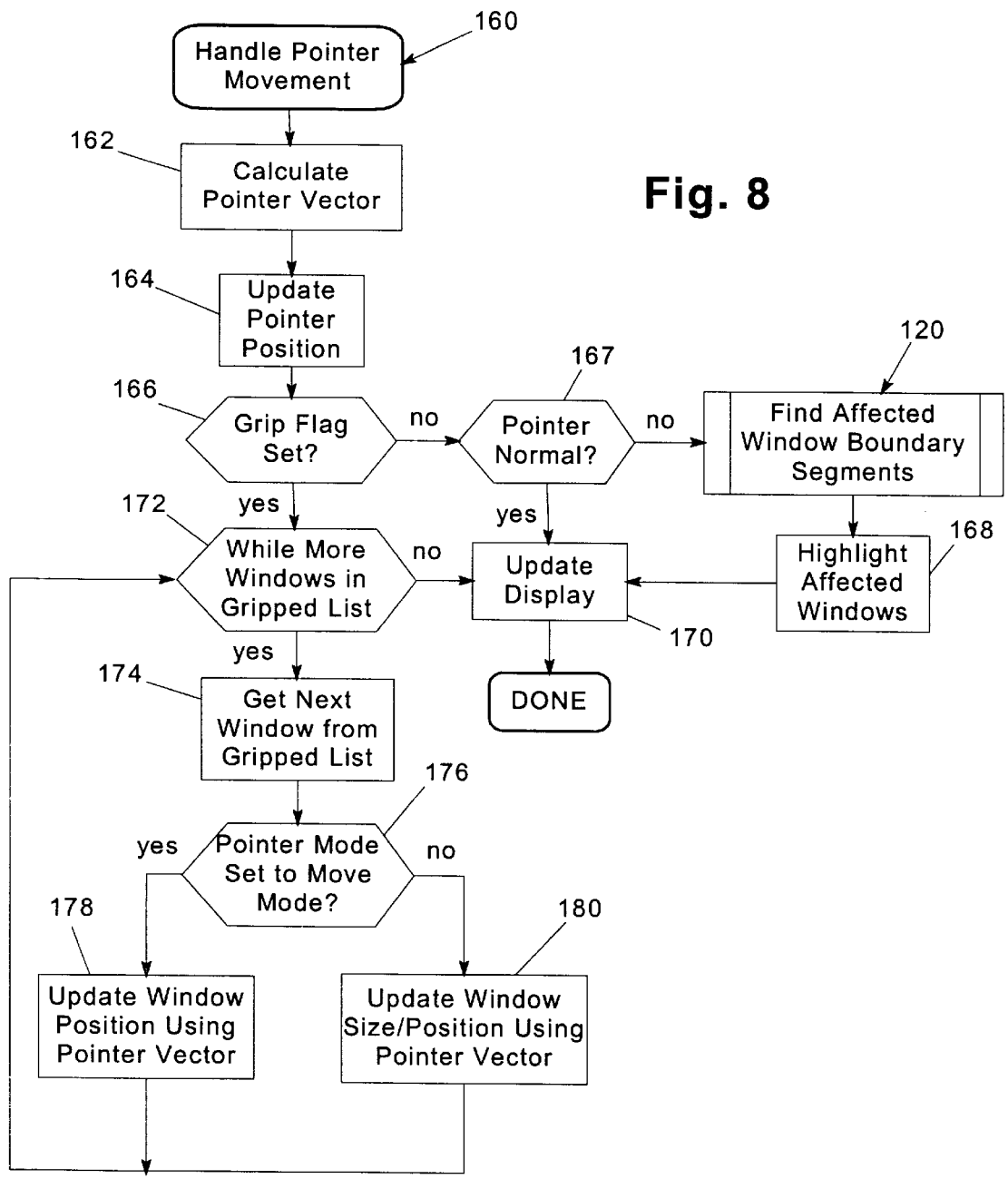
FIG. 8 is a flowchart illustrating the program flow of the handle pointer movement routine of FIG. 3.

Handle pointer movement routine 160 is illustrated in greater detail in FIG. 8. Typically, routine 160 will be supplied with a vector defining the distance and direction of movement of the pointer that is requested by a user. The vector may be defined in terms of start and end positions, or in the alternative, may be defined by a direction and a distance relative to a start (or current) position of the pointer. Accordingly, routine 160 begins in block 162 by calculating that pointer vector.

Next, in block 164, the position of the pointer is updated in a manner well-known in the art.

Next, block 166, diverts control to one of two program flows depending upon whether the grip flag has been set. If the grip mode has not been set, block 166 passes control to block 167 to determine whether the current pointer mode is the normal mode. If it is not (indicating that the pointer mode is either the move or resize mode), block 167 calls routine 120 (FIG. 6) prior to passing control to blocks 168 and 170, which respectively highlight the affected windows indicated by routine 120, and update the display. If the current pointer mode is the normal mode, block 167 diverts control to block 170 to update the display without highlighting any windows thereon. In either event, after execution of block 170, routine 160 is terminated. The program flow of routine 160 when the grip flag is not set and either of the move or resize modes are selected generally functions to update the gripped list and the highlighting of the affected windows as the pointer is moved around the display.

Returning to block 166, if the grip flag is set, control is passed to block 172 to determine if additional non-processed windows exist in the gripped list. For example, if the gripped list is not empty, block 172 will initially pass control to block 174 to retrieve the next window from the gripped list. Next, block 176 is executed to determine whether the pointer mode is set to move mode. If it is, control is passed to block 178 to update the window position using the pointer vector calculated in block 162 above. In this manner, the window is moved concurrently with the pointer. Control is then returned to block 172 to determine whether additional windows exist in the gripped list that have not been processed.

Returning to block 176, if the pointer mode is not set to the move mode, it is assumed that the current pointer mode is the resize mode. Accordingly, control is passed to block 180 to update the size and/or position of the window using the pointer vector. Typically, a window is resized by moving only the affected boundary segments, and leaving any non-affected boundary segments at their original locations (although the lengths thereof may nonetheless be modified due to the movement of adjacent segments). Control is then returned to block 172 to process additional windows in the gripped list.

Once every window in the gripped list has been processed, block 172 passes control to block 170 to update the display and thereby refresh the position and/or size of the affected windows. Routine 160 then terminates.

It should be appreciated that each affected window may be moved or resized in a number of manners. For example, a vector that is identical in direction and length to the pointer vector may be utilized to move or resize a window. In addition, resizing of a window via movement of one or more affected boundary segments may utilize only a component of the pointer vector. For example, for a given affected boundary segment, it may be desirable to utilize only that component of the pointer vector that is perpendicular to the affected boundary segment. For a vertically-oriented boundary segment, it may be desirable to use only the horizontal component of the pointer vector. Similarly, for a horizontally-oriented boundary segment, it may be desirable to utilize only the vertical component of the pointer vector. It should also be appreciated that the movement of windows may also be constrained to horizontal and vertical directions consistent with the invention.

It should further be appreciated that only the outlines of the affected windows may be displayed during the movement or resizing operations. As a result, it may be possible to avoid much of the added overhead associated with fully and repeatedly redrawing multiple windows during these operations.

Figure 9:
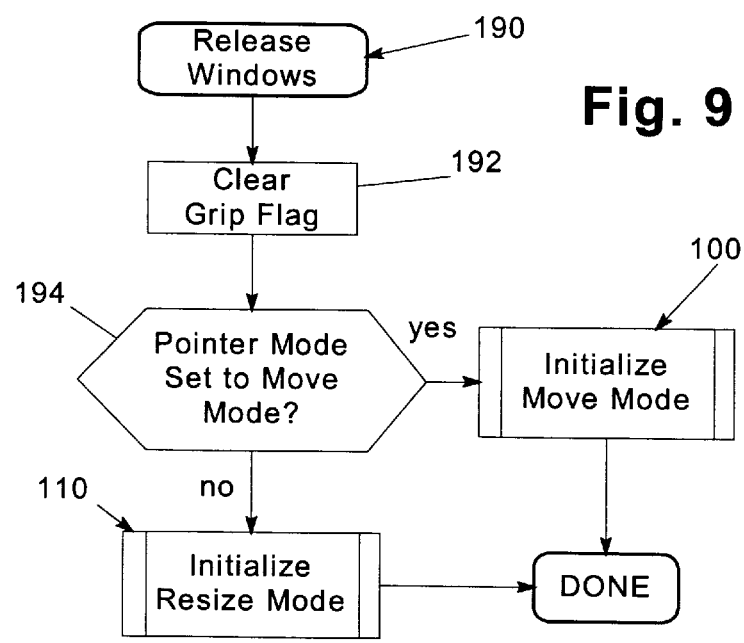
FIG. 9 is a flowchart illustrating the program flow of the release windows routine of FIG. 3.

Release windows routine 190 is illustrated in greater detail in FIG. 9. Routine 190 begins at block 192 by clearing the grip flag that was previously set by routine 140. Next, block 194 determines whether the pointer mode is currently set to the move mode. If it is, routine 100 is called to re-initialize the move mode as discussed above with reference to FIG. 4. If not, routine 110 is called to re-initialize the resize mode in the manner described above with reference to FIG. 5. In either event, once the appropriate mode has been reset, routine 190 terminates. Accordingly, once the release event has been processed, the pointer returns to the same mode that it was in at the time of the grip event.

Figure 10:
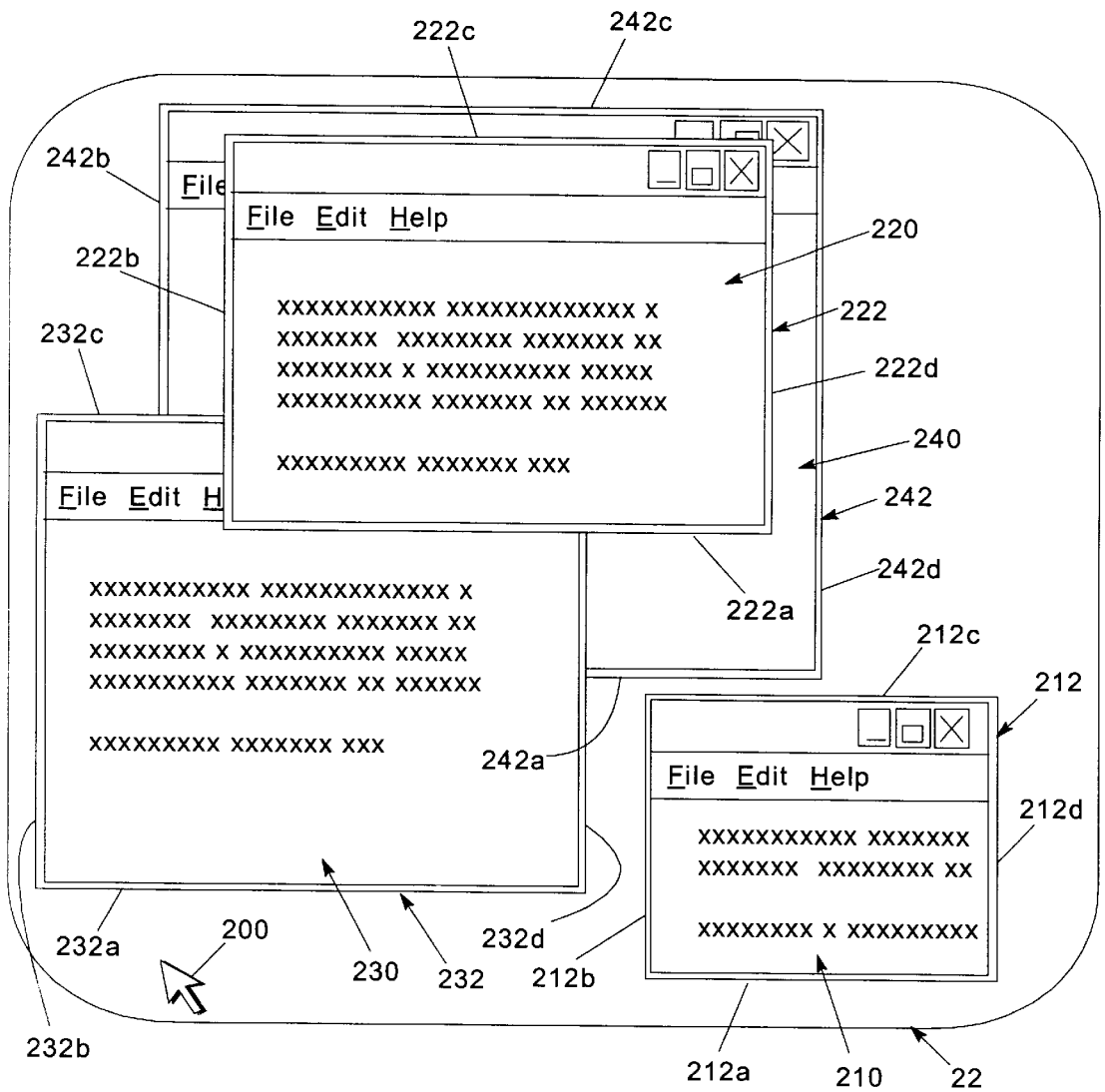
FIG. 10 is a block diagram illustrating a computer display within which is displayed a pointer and a plurality of windows.

As an example of the operation of the several proximity manipulation features consistent with the invention, FIG. 10 illustrates a computer display 22 upon which is displayed a pointer 200 controlled via a mouse or similar device, and a plurality of windows 210, 220, 230 and 240. Window 210 includes a boundary 212 including four boundary segments 210a–210d. Likewise, window 220 includes a boundary 222 with boundary segments 222a–222d, window 230 includes a boundary 232 including boundary segments 232a–232d, and window 240 includes a boundary 242 including boundary segments 242a–242d.

Figure 11:
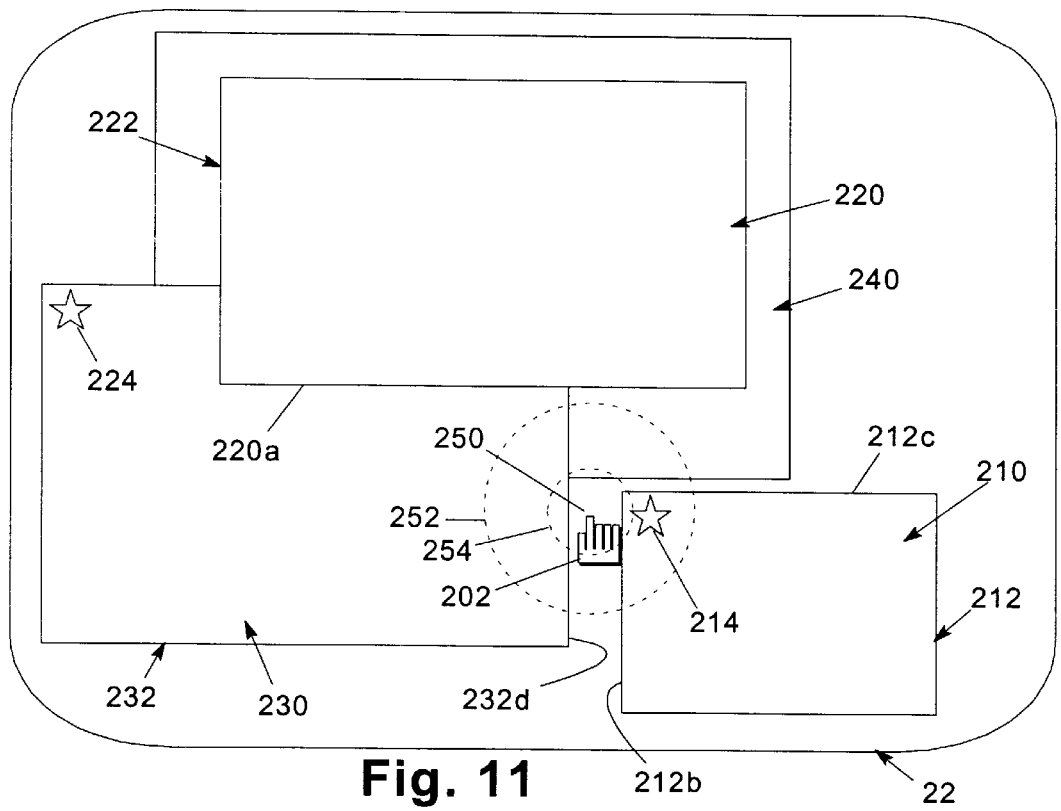
FIG. 11 is a block diagram of the computer display of FIG. 10, showing the highlighting of windows defined within a grip span after selection of a move or resize pointer mode.
Figure 12:
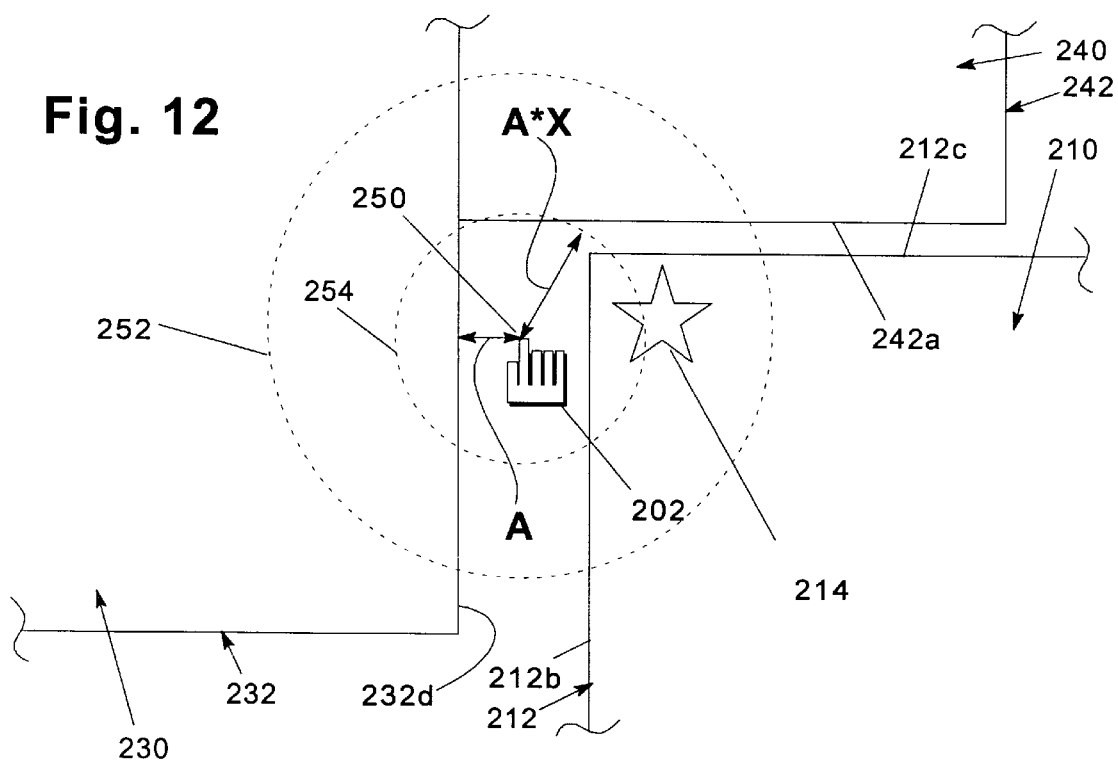
FIG. 12 is an enlarged fragmentary view of the computer display of FIG. 11, illustrating the dynamic determination of a grip span.

FIGS. 11–15 illustrate various events handled by the computer system in the manner described above. For example, FIG. 11 illustrates the initiation of the move pointer mode by a user when pointer 200 is located at the position shown at 202. In this example, the origin of the proximity range is shown at 250, with a search span defined with a predetermined radius at 252.

As discussed above, upon initiation of the move mode, routine 100 is executed to set the pointer mode to the move pointer in blocks 102 and 104 (FIG. 4). As such, a move pointer representation as shown at 202 may be used to distinguish the move pointer from a normal pointer, (e.g., as shown at 200 in FIG. 10).

Routine 120 (FIG. 6) is next called to find each affected window within the grip span defined for the pointer. The dynamic calculation of the grip span is illustrated in greater detail in FIG. 12, where the distance to the closest window within search span 252 is illustrated at A. Based upon distance A, a circular grip span 254 may be defined having a radius equal to A*X, where X is the scaling factor set by the user.

Returning to FIG. 11, it may be seen that boundary segments 212b and 212c of window 210, as well as boundary segment 232d of window 230, are at least partially disposed within grip span 254. Accordingly, there windows are determined to be affected windows. As a result, these windows may be highlighted, e.g., using icons 214 and 224, respectively.

FIG. 11 also illustrates that it is possible to include a depth factor for the grip span to limit the depth of the proximity range for the pointer. In this example, the "level" of any selected window is determined by adding one to the level of the lowest-level window overlapping the selected window, with any non-overlapped windows set to a top level such as "Level 0". Other manners of numbering levels may be used in the alternative.

Since no other windows overlap windows 210 and 220, these windows are designated herein as Level 0 windows. Window 230, which is overlapped only by a Level 0 window, may be designated as a Level 1 window, and window 240, which is overlapped by a Level 0 window (window 220) and a Level 1 window (window 230) may be designated as a Level 2 window. Assuming that the grip span is set to include only Level 0 and Level 1 windows, it may be seen that window 240 may be excluded as an affected window even though a boundary segment thereof intersects grip span 254. As discussed above, in other embodiments no depth factor may be incorporated into the grip span, whereby window 240 would be included as an affected window.

Another particularly desirable manner of implementing a depth factor for a grip span is to dynamically determine a base level and include only windows within a predetermined number of levels from the base level. For example, similar to the dynamic determination of a grip span origin or radius, it may be desirable to locate the closest window to the pointer and set the base level for the grip span to the level of that closest window. Then, the levels of any windows falling within the grip span may be compared to the base level, with the affected windows limited to those windows within the grip span that are within a delta level value from the base level set by the closest window. Other manners of implementing a depth factor for a grip span may also be used consistent with the invention.

Figure 13:
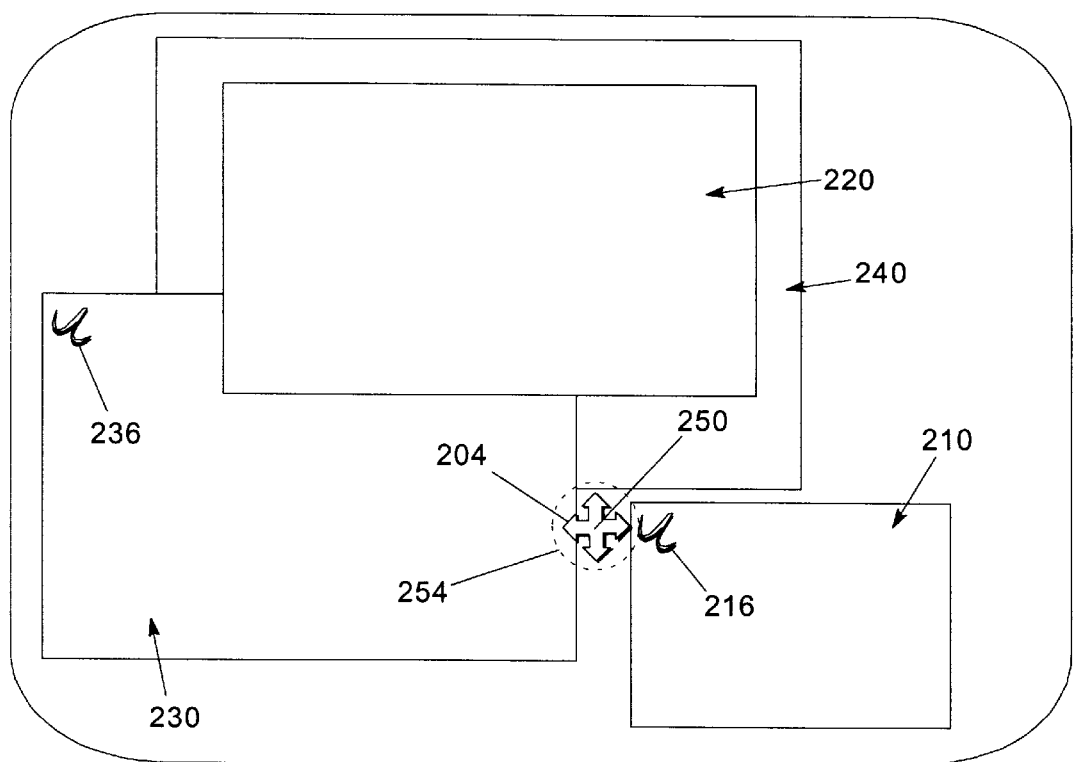
FIG. 13 is a block diagram of the computer display of FIG. 11, showing the highlighting of affected windows defined within a grip span after selection of a grip mode.

Turning to FIG. 13, the initiation of a grip event is illustrated. In such an instance, routine 140 (FIG. 7) is executed to set the grip flag, set the pointer to a grip pointer, and highlight all affected windows. Accordingly, FIG. 13 illustrates the pointer in a grip pointer representation 204 centered over origin 250. In addition, FIG. 13 illustrates the feature that separate highlighting may be performed to distinguish gripped windows from affected windows prior to gripping, (e.g., using separate icons 216, 236 displayed respectively on windows 210, 230).

Figure 14:
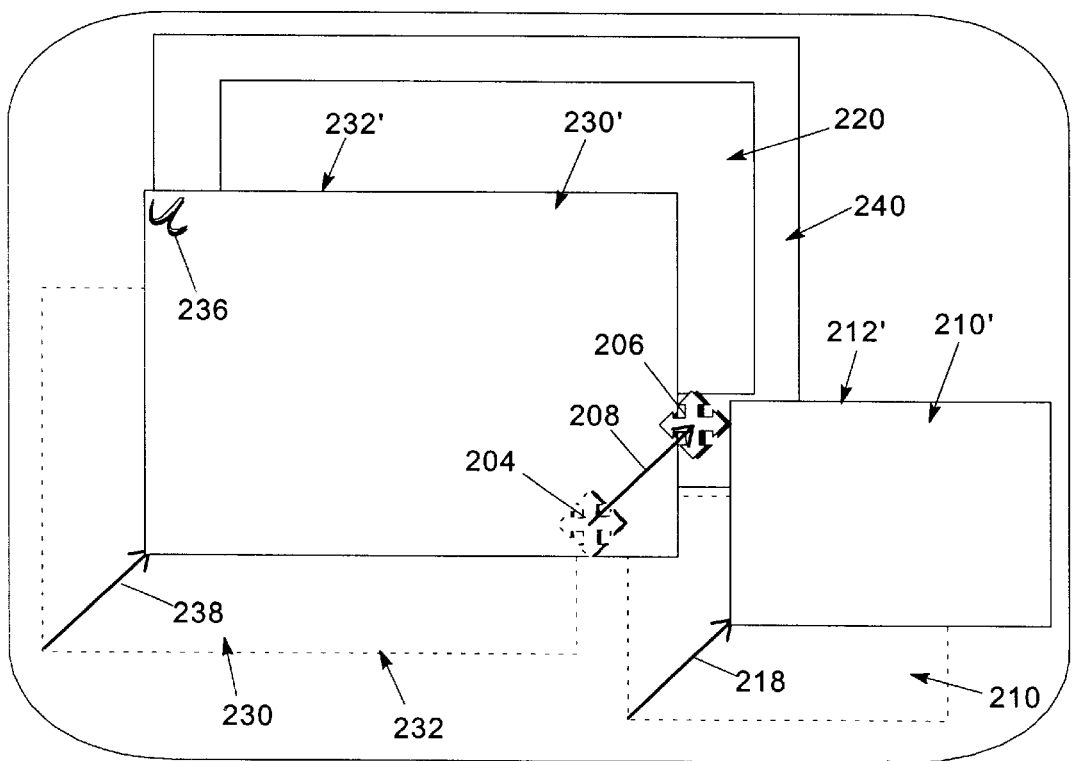
FIG. 14 is a block diagram of the computer display of FIG. 13, showing the movement of affected windows in response to pointer movement while in a move pointer mode, with original positions of the affected windows shown in phantom.

After the grip event has been initiated, movement of the pointer results in either movement of the affected windows or resizing of the affected windows depending upon the current mode of the pointer. For example, as shown at FIG. 14, if the pointer is in a move mode, movement of the pointer from position 204 to position 206 along a pointer vector 208 results in movement of window 210 along a vector 218 to a position illustrated at 210', where each segment in boundary 212' has also been moved along vector 218. In addition, window 230 has been moved along a vector 238 that is identical in direction and distance to vectors 208 and 218, such that window 230 is now positioned at location identified at 230' (with new boundary 232').

As it may also be appreciated from FIG. 14, an additional step that may be performed during movement of a pointer is that of activating the affected windows, or in the least, promoting each of the windows to a higher level. Window 230, for example, is shown being promoted to a Level 0 window that now overlaps window 220.

Figure 15:
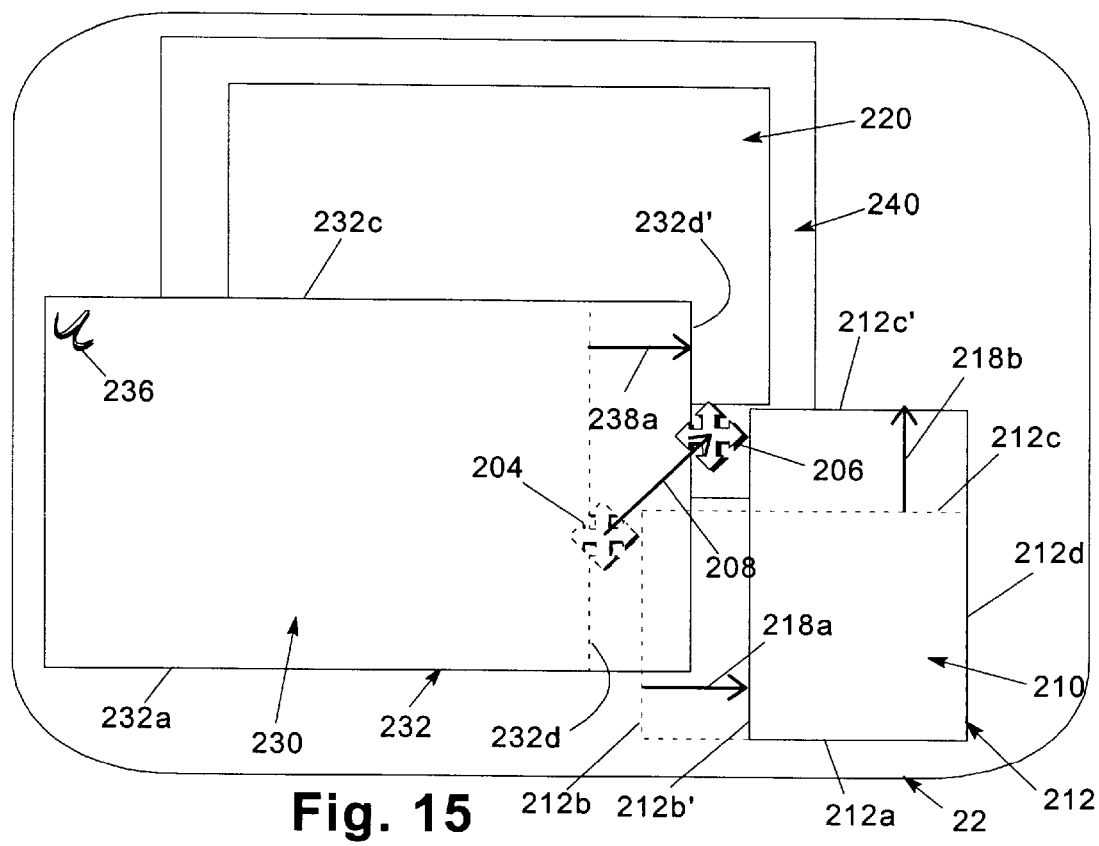
FIG. 15 is a block diagram of the computer display of FIG. 13, showing the resizing of affected windows in response to pointer movement while in a resize pointer mode, with original sizes of the affected windows shown in phantom.

FIG. 15 illustrates movement of the pointer from position 204 to position 206 along the same vector 208, but while the pointer is in a resize mode. In this instance, the affected window segments of each window 210, 230 are moved in accordance with the components of the pointer vector that are perpendicular to such segments.

For example, boundary segment 212b of window 210 is moved along a vector 218a to a position shown at 212b'. This movement is along a vector 218a having a horizontal direction and a distance that is equal to a horizontal component of pointer vector 208. Similarly, boundary segment 212c of window 210 is moved along vector 218b to a position shown at 212c'. Vector 218b has a vertical direction and a distance that is equal to a vertical component of vector 208.

For window 230, only boundary segment 232d is affected, and accordingly, this segment is moved along a vector 238a (having a horizontal direction and a length equal to vector 218a and to the horizontal component of vector 208) to the position shown at 232d'. Again, window 230 is illustrated as being activated or promoted to Level 0 in response to the movement of the pointer in the resize mode. It should be appreciated that in other embodiments, however, modification of the current level of a window in response to a grip event may not be performed.

Various modifications may be made to the embodiments described herein without departing from the spirit and scope of the invention. For example, it should be appreciated that only a resize mode or a move mode may be utilized in a computer system.

Moreover, it should be appreciated that other manners of initiating any of the resize, move, or grip modes may be used consistent with the invention. For example, it may be desirable to utilize separate move and resize grip modes and eliminate any highlighting of affected windows prior to initiation of either grip mode. As such, a user would not be required to place the pointer in a specific move or resize mode prior to initiating a grip event. Instead, separate user input combinations would be used for each grip mode. As one example, a user could depress a mouse button while depressing the control key on the keyboard to enter a move grip mode or depress a mouse button while depressing the shift key to enter a resize grip mode.

In other embodiments, it may be desirable to utilize intermittent "preview" modes whereby a user could depress a key and/or a mouse button while the pointer is at a predetermined location to permit a user to briefly see which windows will be affected, and then enable a user to select a move grip mode or resize grip mode to perform the desired operation, again without placing the pointer in a specific move or resize mode. In other embodiments, initiation of a move grip mode or resize grip mode, without a corresponding movement of the pointer, may be sufficient to provide a "preview" function to permit a user to determine whether it is desirable to move or resize the current group of affected windows.

Figure 16:
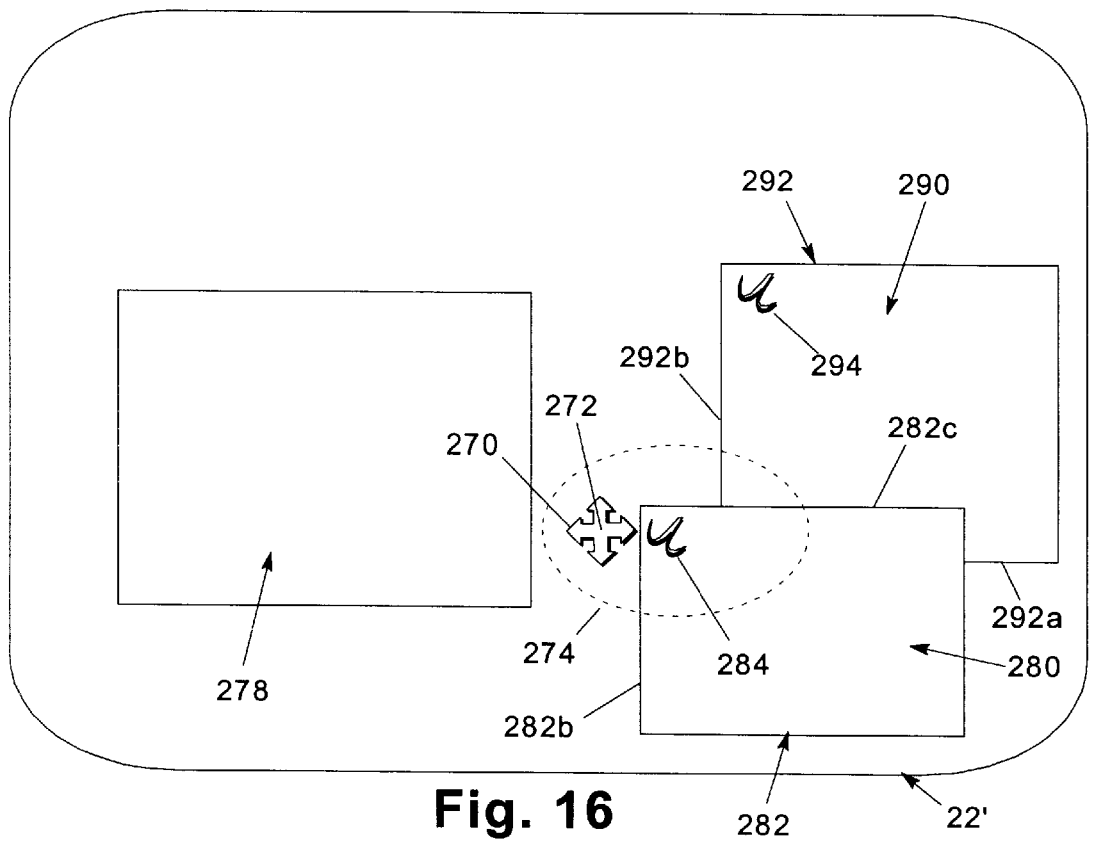
FIG. 16 is a block diagram of a computer display, showing an alternate grip span to that shown in FIG. 13.

FIG. 16 illustrates another feature that may be utilized consistent with the invention, namely that of utilizing a focused grip span that extends predominantly along a predetermined direction in response to specific user input. As shown in this Fig., computer display 22' displays a pointer 270 defining a origin 272. A focused grip span 274 is defined as an ellipse extending predominantly to the right of pointer 270. As such, a window 278 that is located proximate pointer 270 but to its left is not affected, but windows 280 and 290 are affected, due to the intersection of the grip span with boundary segments 282b and 282c of boundary 282, and segments 292a and 292b of boundary 292. Accordingly, windows 280 and 290 are shown designated as affected windows via icons 284 and 294, respectively.

As discussed above, the use of a focused grip span as an alternative to a circular grip span may be performed via specific user input, e.g. a specific keystroke and/or mouse depression. This would permit, for example, multiple alternate grip span configurations to be utilized, with the user selecting one of the available configurations as desired. It should also be appreciated the selection of one grip span may also be performed prior to initiation of a grip event, so that the affected windows for a particular grip span could be previewed by a user.

As one possible configuration, a user may be permitted to select between left and right focused grip spans and a circular grip span based upon different depressions of the left and right mouse buttons. Depression of the left mouse button by itself may result in a grip span that is focused to the left, while the depression of the right mouse button by itself may result in a grip span that is focused to the right. Depression of both left and right mouse buttons simultaneously may result in a circular grip span. Other modifications will be apparent to one of ordinary skill in the art.

Concurrent Depth Manipulation of Windows and the Like

Figure 17:
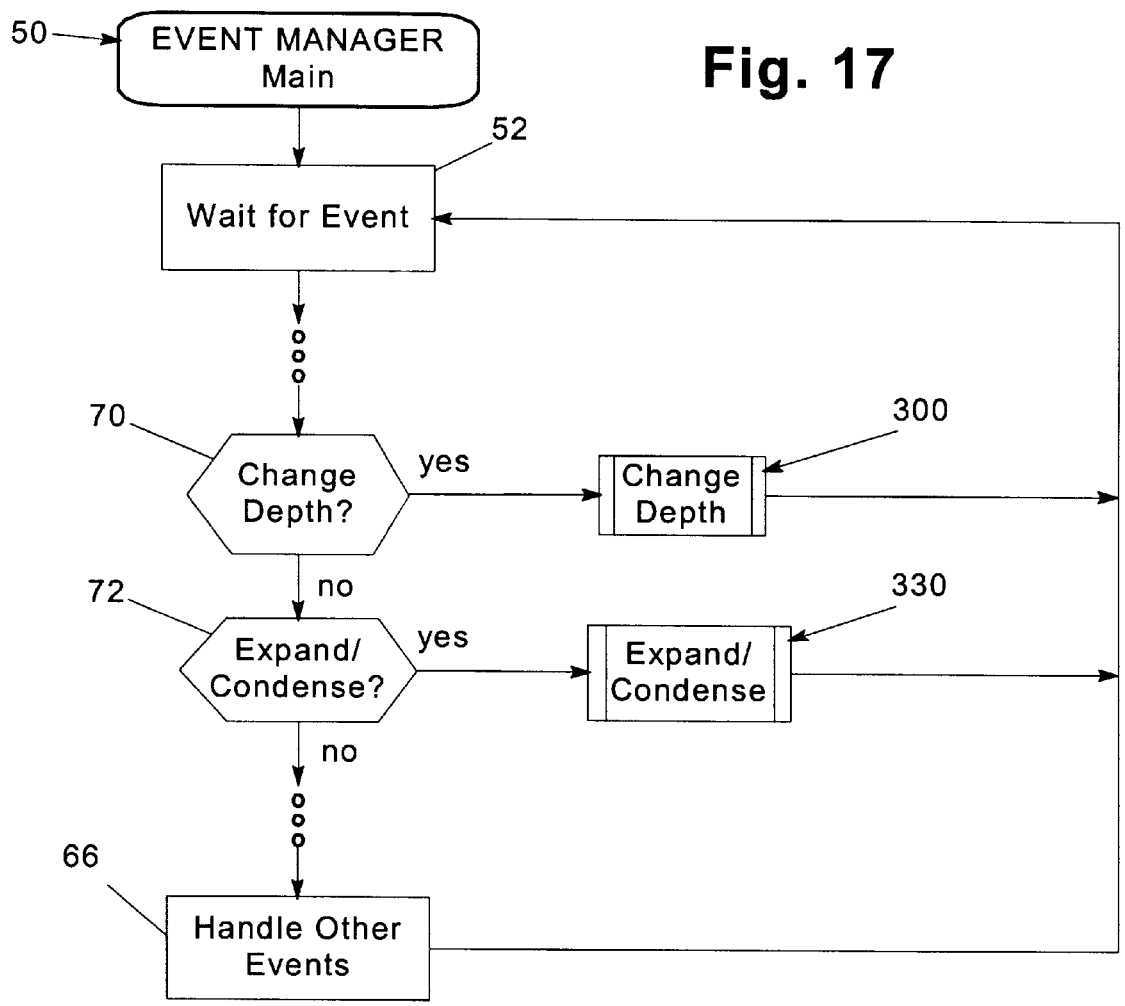
FIG. 17 is a flowchart illustrating the program flow for several additional events that may be handled by the main routine of FIG. 3.

A number of additional modifications may be made consistent with the invention. For example, FIG. 17 illustrates an additional block 70 in routine 50 that detects a "change depth" event and thereby passes control to a change depth routine 300, illustrated in FIG. 18. In particular, it may be desirable to selectively modify the depth (or level) of a window when the window is gripped by the proximity pointer, e.g., in response to additional user input supplied by a user. This feature may be enabled in both the resizing and move modes, or more preferably, only in the move mode. The specific user input that initiates such an event may be based upon any number of user input combinations. For example, while in the move mode, it may be desirable to initiate a change depth event in response to depression of an up or down arrow on the keyboard. In this manner, a user may be able to move a group of affected windows up or down in the hierarchy of windows displayed on the computer display. Consequently, even greater flexibility in terms of operating on different windows displayed on a computer system may be provided.

Figure 18:
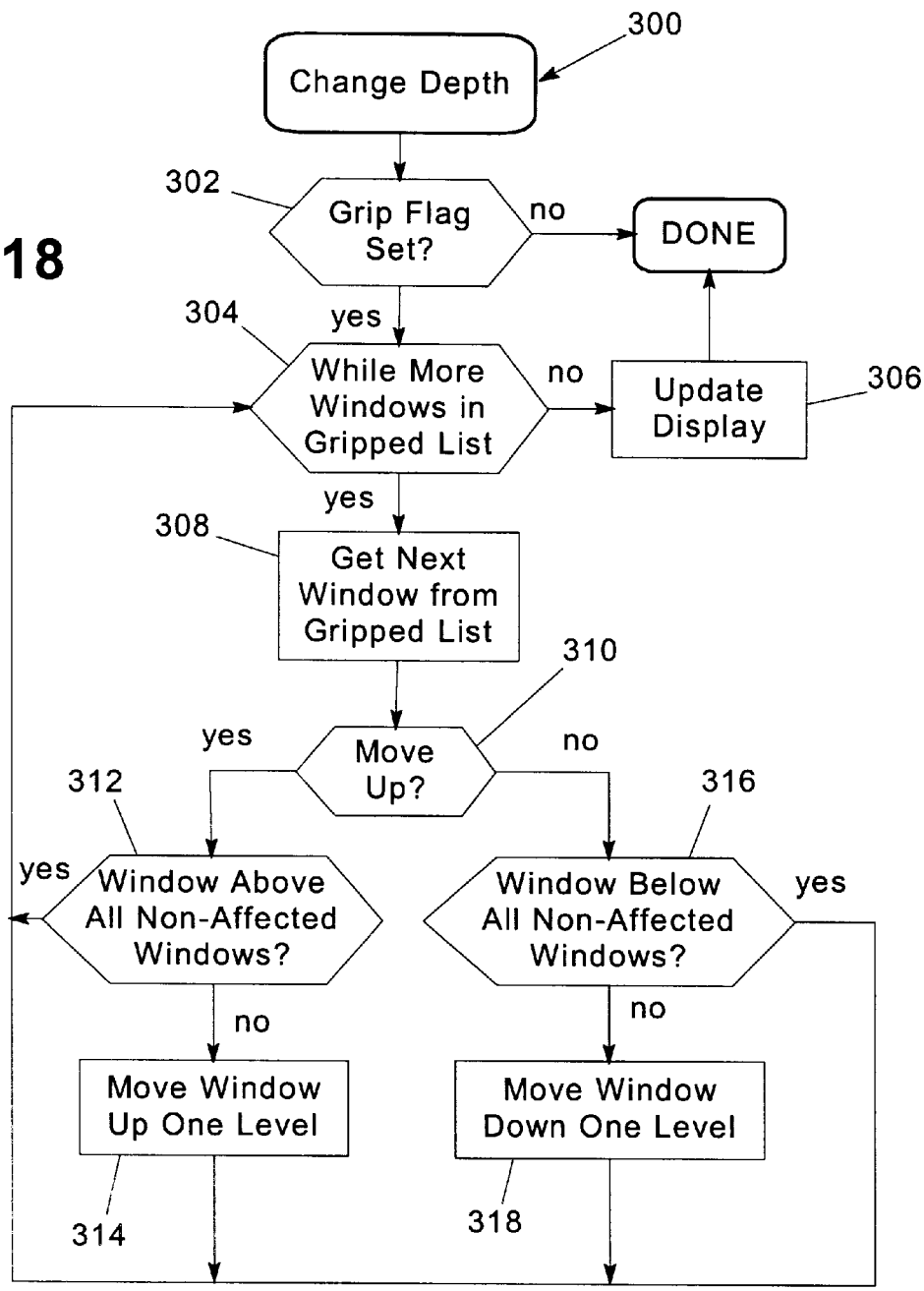
FIG. 18 is a flowchart illustrating the program flow of the change depth routine of FIG. 17.

As shown in FIG. 18, routine 300 begins at block 302 by determining whether the grip flag has been set. If not, routine 300 is terminated, and the change depth event is ignored. In the alternative, it may be desirable to permit manipulation of the depth of a window prior to setting of the grip flag. If the grip flag has been set, block 302 passes control to block 304 to initiate a loop that processes each window in the gripped list. If no windows are stored in the gripped list, control is immediately passed to block 306 to update the display and terminate the routine. As long as additional unprocessed windows exist in the gripped list, however, control is passed to block 308 to retrieve the next window from the gripped list, then block 310 is executed to determine whether the change depth event is a request to move the affected windows up or down in the window hierarchy, also referred to as "promoting" or "demoting" the windows.

For a request to move the affected windows up (e.g., in response to depression of the "up" arrow key), control is passed to block 312 to determine whether the window is at a level that is above all non-affected windows on the display. If so, the window is currently disposed at the top level possible, assuming that the relative levels of the other affected windows are maintained. Accordingly, control is diverted to block 304 to process the next window without modifying the level of the current window.

If the window is not disposed above all non-affected windows, control is passed to block 314 to move the window up one level, prior to returning control to block 304 to process additional windows. It should be appreciated that promoting a window may in some circumstances require demotion of other windows on the display.

Returning to block 310, if a move down request has been initiated (e.g., in response to depression of the "down" arrow key), block 316 is executed to determine whether the window is at a level that is below that of all non-affected windows. If so, control is diverted to block 304 without modifying the level of the current window. If, however, the window is not disposed below all non-affected windows, control is passed to block 318 to demote the window prior to returning control to block 304.

Once all windows in the gripped list have been processed, control is passed by block 304 to block 306 to update the display, and thereafter terminate the routine.

Typically, a window is promoted or demoted one level in response to a move up or move down request. In the alternative, it may be desirable to utilize movement of the pointer (e.g., in left and right directions, or up and down directions) to selectively promote or demote affected windows dynamically. Other modifications will be apparent to one of ordinary skill in the art.

Concurrent Expansion/Condensation of Windows and the Like

Returning to FIG. 17, another feature that may be implemented by the embodiments described herein is an expand/ condense feature. This feature is initiated by an event that is detected at block 72 of routine 50, and that is handled by routine 330. The expand/condense feature generally operates by moving and/or resizing windows either inwardly or outwardly with respect to a common origin. Generally, the movement of or resizing of such windows may be performed radially with respect to the current position of the pointer. In alternate embodiments, however, other directions generally inwardly or outwardly with respect to an origin may be defined consistent with the invention.

Typically, an expand/condense event is initiated after the grip event has been activated, such that the windows that are manipulated by the expand/condense event are limited to the previously-determined affected windows. In the alternative, the expand/condense event may be utilized prior to entering the grip mode. In addition, the expand/condense feature may be provided separately of other proximity features consistent with the invention.

Any number of user input combinations may be utilized to initiate an expand/condense event. For example, a "left" arrow key depression may be utilized to initiate a condense request, while a "right" arrow key may be utilized to initiate a expand request. Other user input combinations, however, may be utilized in the alternative.

Figure 19:
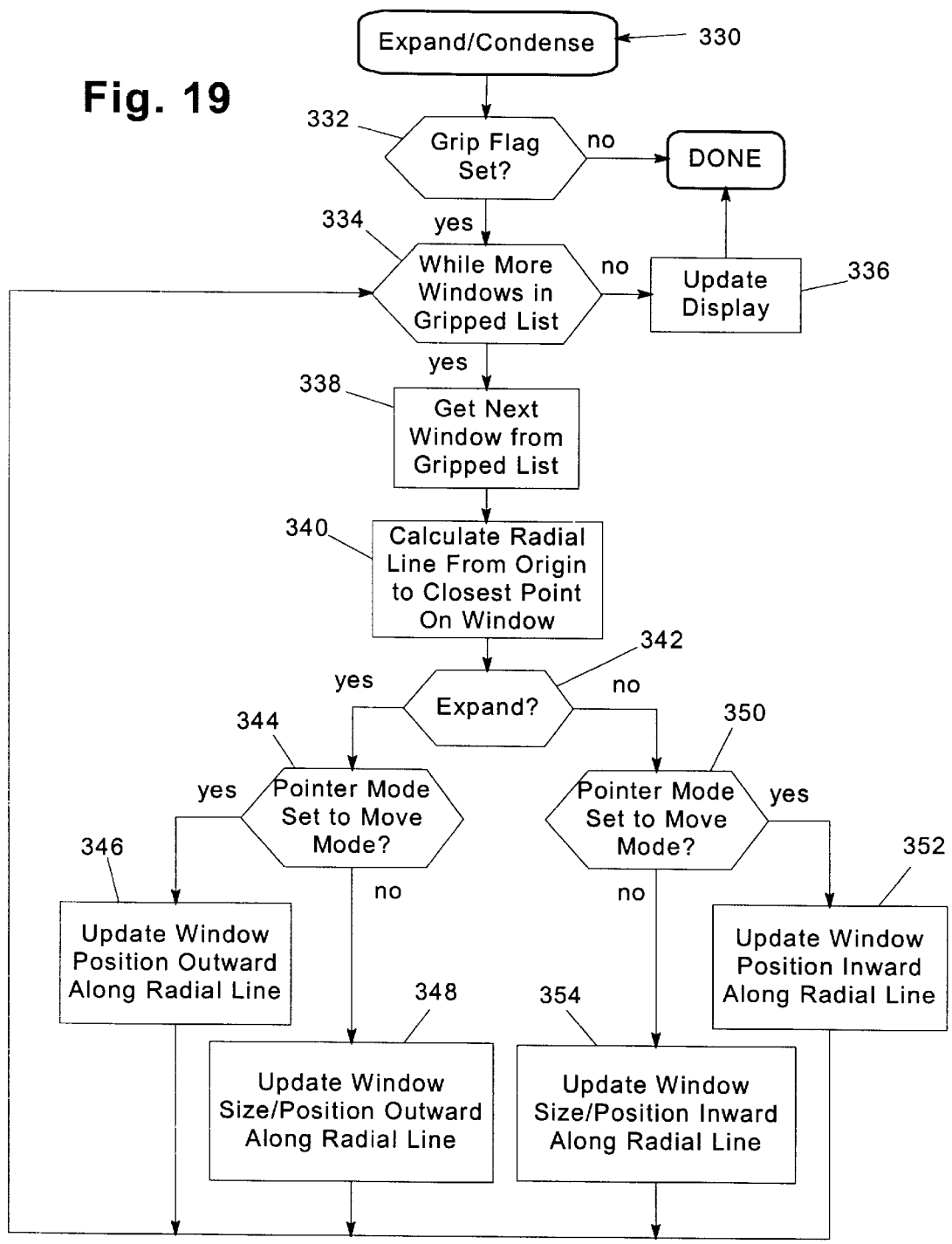
FIG. 19 is a flowchart illustrating the program flow of the expand/condense routine of FIG. 17.

As shown in FIG. 19, for example, routine 330 is implemented by detecting first in block 332 whether the grip flag has been set. If the flag has not been set, routine 330 is terminated to ignore the event. If, however, the grip flag has been set, control is passed to block 334 to initiate a loop to process each window in the gripped list. At block 338, the next window from the gripped list is retrieved. Next, in block 340, a radial line extending from the origin (typically the current location pointed to by the pointer) to the closest point on the window, is calculated. Then, based upon whether the event is a request to expand or condense affected windows, block 342 passes control to either of blocks 344 or 350.

If the event includes a request to expand the affected window (i.e., to move or resize each window outwardly from the origin), block 344 is executed. Depending upon whether the pointer mode is set to the move mode or the resize mode, control is either passed to block 346 or block 348. If the pointer mode is set to the move mode, block 346 updates the window position outwardly along the radial line defined for the window. Typically, a predetermined increment is utilized to update the window position, although it may be desirable in some applications to tie the amount of the increment to movement of a pointer, the amount of time in which a mouse button is depressed, or the like. These latter instances would permit, for example, a user to dynamically expand or condense the affected windows within a continuous range.

Returning to block 344, if the pointer mode is set to a resize mode, block 348 is executed to update the window size and/or position outwardly along the radial line, typically resulting in a decrease in the size of the window. Typically, a resize of a window in this manner is performed by moving the affected boundary segments of the window while maintaining the non-affected segments at a fixed location. The resizing of a window may be performed along the direction of the radial line, or in the alternative, may utilize only a component thereof, (e.g., the component that is perpendicular to any given affected boundary segment).

Returning to block 342, if a condense request is incorporated in the event, block 350 is executed, and depending upon whether the pointer mode is set to a move mode or a resize mode, one of blocks 352 or 354 is executed.

If the pointer is set to a move mode, block 352 updates the window position inwardly along the radial line, typically utilizing a fixed increment as described above. If the pointer mode is set to a resize mode, however, the window size and/or position are updated in block 354 inwardly along the radial line, in much the same manner as block 348. After execution of any blocks 346, 348, 352 or 354, control returns to block 334 to process each additional window in the gripped list, until such time as all windows have been processed. Then, block 336 is executed to update the display and terminate routine 330.

Figure 20:
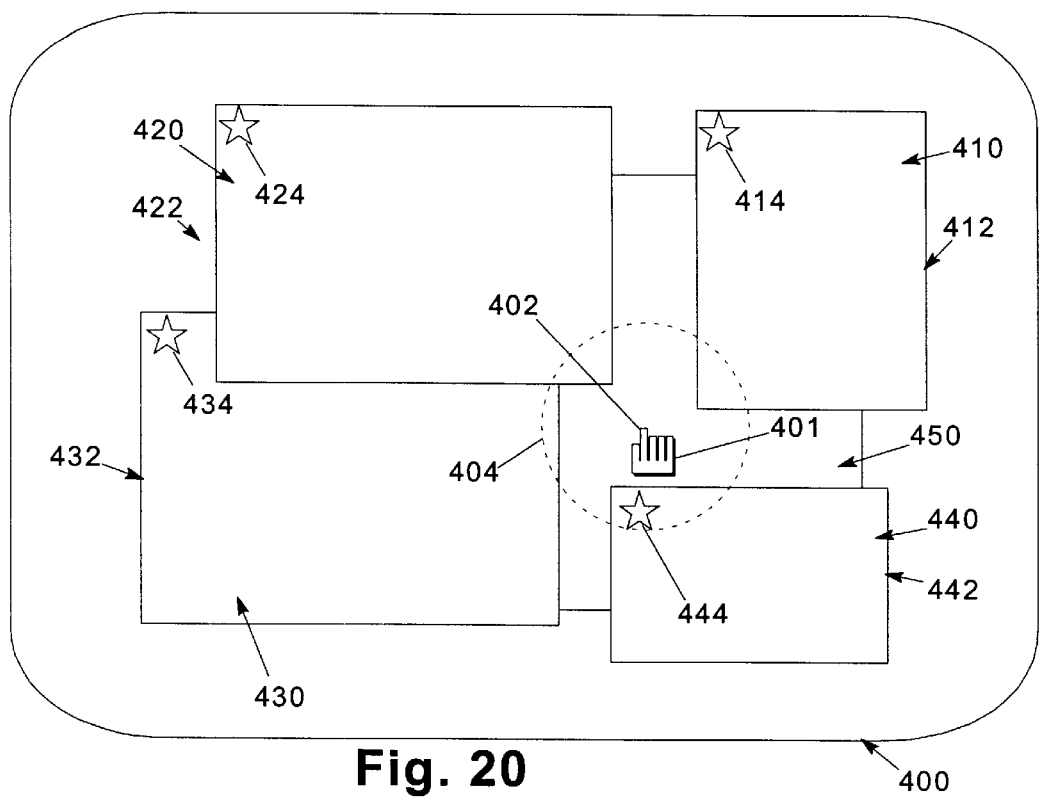
FIG. 20 is a block diagram illustrating another computer display within which is displayed a pointer and a plurality of windows.

As an example of the operation of the expand/condense feature consistent with the invention, FIG. 20 illustrates a display 400 upon which is displayed a pointer 401 and four windows 410, 420, 430 and 440 overlapping an additional window 450. Pointer 401 is shown having an origin 402 and a grip span defined at 404.

FIG. 20 illustrates the condition of the computer system prior to a grip event. As each of windows 410–440 includes an affected boundary segment from the respective boundaries 412, 422, 432 and 442 thereof, each of windows 410–440 is designated an affected window via icons 414, 424, 434 and 444, respectively.

Figure 21:
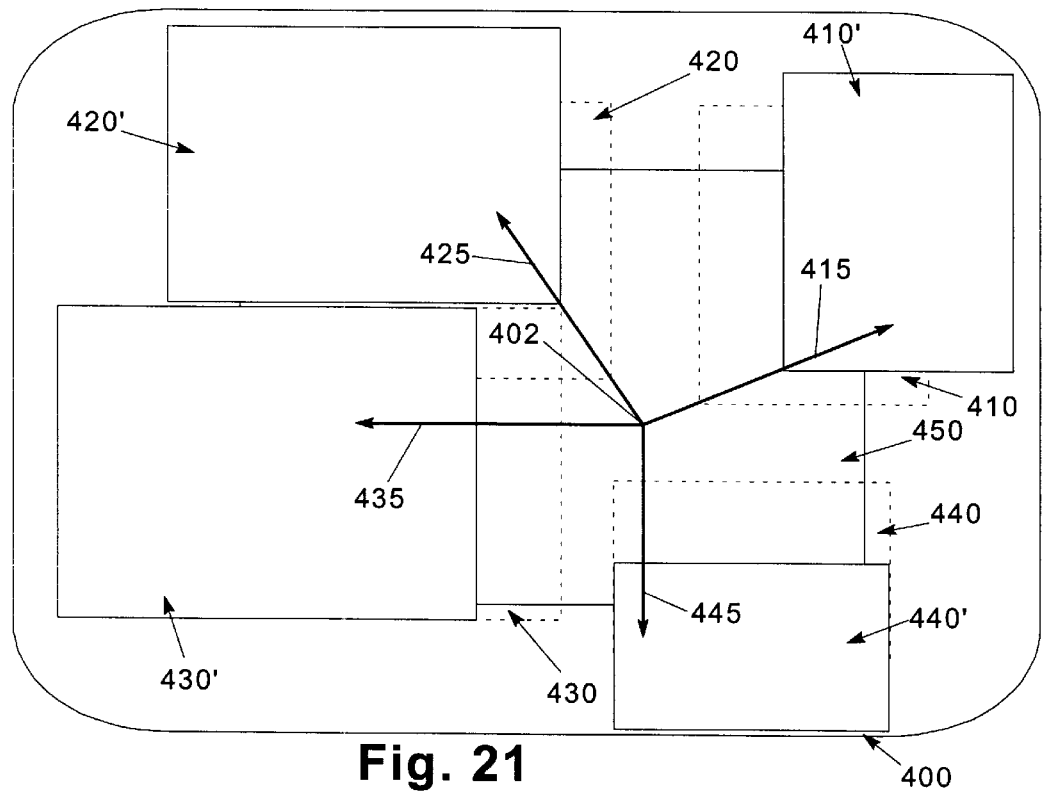
FIG. 21 is a block diagram of the computer display of FIG. 20, showing the movement of affected windows radially outward from an origin in response to user input.

FIG. 21 illustrates display 400 after initiation of a grip event, as well as after initiation of an expand request, handled in the manner discussed above by routine 330 of FIG. 19. For each window 410–440, a radial line 415, 425, 435 and 445, respectively, is calculated from origin 402 to the closest point thereon. Each window is then moved outwardly a predetermined increment to the positions illustrated at 410', 420', 430' and 440', respectively.

It should be appreciated that a condense event operates in a similar manner to move each window closer to origin 402 by a predetermined increment. It should also be appreciated that limits may be placed on either of the expand and condense functions such that windows are maintained within the display as well as in the same direction relative to origin 402. In the alternative, inward movement beyond origin 402 may result in the windows being mirrored across the origin.

It should also be appreciated that resizing inwardly or outwardly occurs in much the same manner as movement of the windows, albeit with only the affected window segments being modified by the event. Other modifications will be apparent to one of the ordinary skill in the art.

Among the innumerable applications of the proximity manipulation feature in graphical user interface environments such as for operating systems as well as specific computer software applications, one specific use of the feature is in an abstraction stack application. Generally, an abstraction stack represents information from a body of knowledge (BOK), which typically represents a collection of information related to a particular subject of interest. A body of knowledge is delimited into a plurality of levels of abstraction, each of which typically represents a particular manner of looking at a given body of knowledge. An abstraction stack concurrently displays multiple information elements associated with different levels of abstraction on a computer display, and visually links the information elements on the computer display in a three dimensional workspace to represent a hierarchical arrangement of the levels of abstraction.

Figure 22:
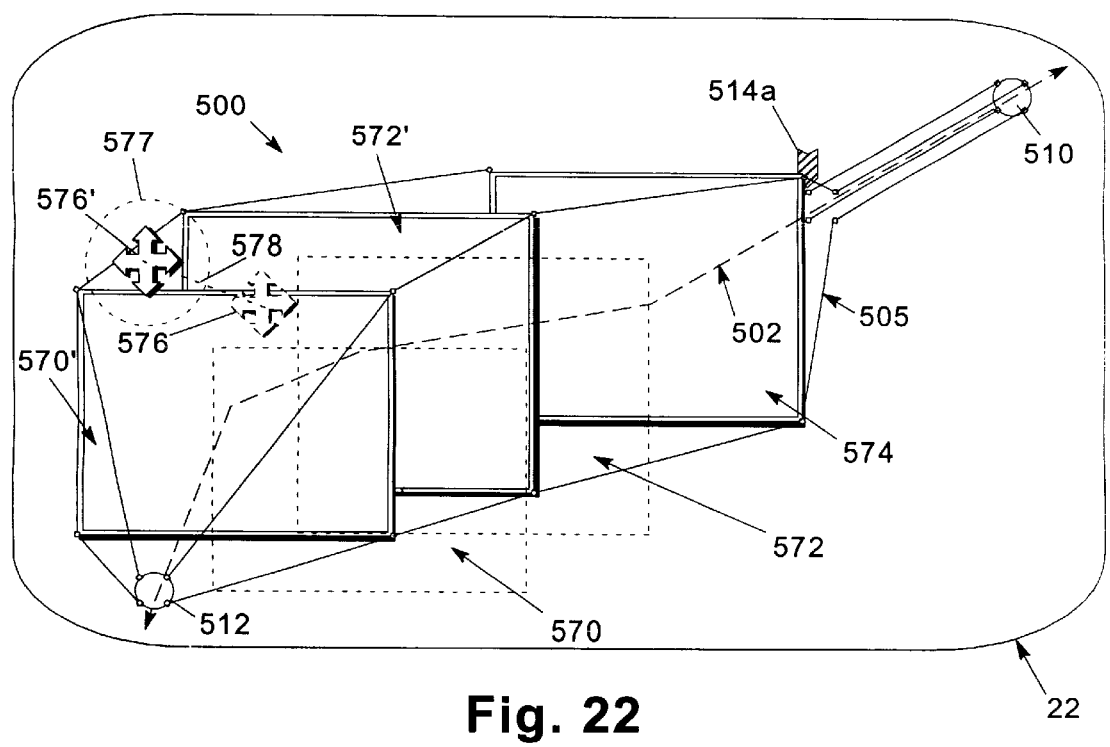
FIG. 22 is a block diagram of a computer display, showing an abstraction stack consistent with the invention.

For example, FIG. 22 illustrates an abstraction stack 500 including a plurality of rendered objects defined along a depth vector 502. A pair of compass handles 510, 512 define the end of the abstraction stack, with intermediate objects such as an intersection point 514a and lenses 570, 572 and 574 interposed therebetween. Intersection point 514a represents a level of abstraction for the body of knowledge, and each lens is defined with a specific filter configuration that displays information from one or more levels of abstraction in the body of knowledge. Binder bands 505 extend between the objects disposed along the depth vector to assist in providing a visual representation of the hierarchical relationship of the objects in a three dimensional workspace.

In an abstraction stack, it is possible for one lens to overlap another lens and thereby hide a portion of the information presented in the overlapped lens, e.g., as shown by the phantom representations of lenses 570 and 572 overlapping lens 574. However, so that the hierarchical relationship of the rendered objects is maintained, it is preferable to not permit lens 574 to overlap either lens 570 or 572 (e.g., as would be the case if lens 574 corresponded to a conventional GUI window that could be activated through user selection thereof and brought to the top layer of the display). Therefore, consistent with the invention, it is possible when in a proximity manipulation mode to move pointer 576, e.g., along a vector 578 to the position illustrated at 576', to effect movement of lenses 570 and 572 (which are within a proximity range 577) to the positions illustrated respectively at 570' and 572', and thereby reveal the hidden information in lens 574.

It should be appreciated, however, that the invention should not be limited to use solely in conjunction with an abstraction stack application.

Various additional modifications may be made to the embodiments described herein without departing from the spirit and scope of the invention. Therefore, the invention lies solely in the claims hereinafter appended.

What is claimed is:

1. A method of manipulating a plurality of windows on a computer display, the method comprising:
   (a) displaying a plurality of windows on a computer display;
   (b) displaying a pointer on the computer display;
   (c) defining as affected windows first and second windows from the plurality of windows, each affected window at least partially disposed within a proximity range defined around an origin located proximate the pointer; and
   (d) in response to user input to move the pointer, concurrently manipulating the affected windows.

2. The method of claim 1, wherein each window includes a boundary including at least one boundary segment, wherein each affected window includes an affected boundary segment that is at least partially disposed within the proximity range, and wherein concurrently manipulating the affected windows includes concurrently moving at least the affected boundary segments of the affected windows.

3. The method of claim 2, wherein concurrently moving at least the affected boundary segments of the affected windows includes moving the affected windows.

4. The method of claim 2, wherein concurrently moving at least the affected boundary segments of the affected windows includes resizing the affected windows by maintaining at least one additional boundary segment in the boundary of each affected window at a fixed location.

5. The method of claim 2, further comprising receiving user input to move the pointer along a first vector, and wherein concurrently moving at least the affected boundary segments includes moving the affected boundary segment of at least one affected window along a second vector.

6. The method of claim 5, wherein the second vector extends in the same direction as the first vector.

7. The method of claim 5, wherein the second vector is perpendicular to the affected boundary segment.

8. The method of claim 2, further comprising concurrently moving at least each of the affected boundary segments of the affected windows in one of an inwardly and an outwardly direction relative to the origin in response to user input.

9. The method of claim 1, further comprising selectively enabling defining the first and second windows as affected windows in response to a predetermined user input.

10. The method of claim 9, wherein the predetermined user input includes user selection of a predetermined mode.

11. The method of claim 10, wherein the predetermined user input includes user selection of one of a move mode and a resize mode, wherein in the move mode, concurrently manipulating the affected windows includes moving the affected windows, and wherein in the resize mode, concurrently manipulating the affected windows includes resizing the affected windows.

12. The method of claim 9, wherein displaying the pointer includes selectively displaying one of first and second pointer representations in response to whether defining the first and second windows as affected windows is enabled.

13. The method of claim 9, wherein concurrently moving at least the affected boundary segments is performed in response to a second predetermined user input.

14. The method of claim 13, wherein the second predetermined user input includes depression of at least one mouse button while defining the first and second windows as affected windows is enabled.

15. The method of claim 13, further comprising highlighting the affected windows on the computer display.

16. The method of claim 15, wherein highlighting the affected windows includes highlighting the affected windows prior to receiving the second predetermined user input.

17. The method of claim 1, further comprising defining the origin at a location pointed to by the pointer.

18. The method of claim 1, wherein the proximity range includes an ellipsoid circumscribing the origin.

19. The method of claim 18, wherein the proximity range includes a circle centered at the origin.

20. The method of claim 18, further comprising selecting between first and second geometric shapes as the proximity range in response to user input, the first and second geometric ranges each circumscribing the origin and each extending generally in opposite directions from one another.

21. The method of claim 1, wherein the plurality of windows are each defined at one of a plurality of levels, the method further comprising selectively increasing or decreasing the level of each affected window in response to user input.

22. The method of claim 1, wherein the plurality of windows are each defined at one of a plurality of levels, wherein the proximity range includes a depth associated with a predetermined range of levels, and wherein defining the first and second windows as affected windows includes defining as affected windows only windows defined in the predetermined range of levels.

23. The method of claim 22, wherein the proximity range includes separate geometric shapes defined at each level in the predetermined range of levels.

24. The method of claim 1, wherein concurrently manipulating the affected windows includes activating the first window.

25. The method of claim 1, wherein concurrently manipulating the affected windows includes updating positions of the affected windows, the method further comprising refreshing the computer display.

26. The method of claim 25, further comprising updating the position of the pointer prior to refreshing the computer display.

27. The method of claim 1, wherein concurrently manipulating the affected windows includes performing an operation on the affected windows selected from the group consisting of closing the affected windows, minimizing the affected windows into individual icons, minimizing the affected windows into a single icon, and combinations thereof.

28. A computer system, comprising:

(a) a computer display upon which is displayed a plurality of windows and a pointer;

(b) a user input device configured to receive user input; and (c) a processor, coupled to the computer display and the user input device, the processor configured to define as affected windows first and second windows from the plurality of windows, each affected window at least partially disposed within a proximity range defined around an origin located proximate the pointer, and, in response to user input to move the pointer, to concurrently manipulate the affected windows.

29. A program product, comprising:

(a) a program configured to perform a method of manipulating a plurality of windows on a computer display, the method comprising:

(1) displaying a plurality of windows on a computer display;

(2) displaying a pointer on the computer display;

(3) defining as affected windows first and second windows from the plurality of windows, each affected window at least partially disposed within a proximity range defined around an origin located proximate the pointer; and (4) in response to user input to move the pointer, concurrently manipulating the affected windows; and (b) a signal bearing media bearing the program.

30. The program product of claim 29, wherein the signal bearing media is transmission type media.

31. The program product of claim 29, wherein the signal bearing media is recordable media.

32. A method of manipulating a plurality of graphical user interface components on a computer display, the method comprising:

(a) displaying a plurality of graphical user interface components on a computer display;

(b) displaying a pointer on the computer display;

(c) defining as affected graphical user interface components first and second graphical user interface components from the plurality of graphical user interface components, each affected graphical user interface component at least partially disposed within a proximity range defined around an origin located proximate the pointer; and (d) in response to user input to move the pointer, concurrently manipulating the affected graphical user interface components.

33. The method of claim 32, wherein the plurality of graphical user interface components includes at least one window.

34. A method of manipulating a plurality of windows on a computer display, the method comprising:

(a) displaying a plurality of windows on a computer display;

(b) displaying a pointer on the computer display;

(c) defining as affected windows first and second windows from the plurality of windows, each affected window at least partially disposed within a proximity range defined around an origin located proximate the pointer; and (d) in response to user input, concurrently moving at least a portion of each affected window in one of an inwardly and an outwardly direction relative to the origin.

35. The method of claim 34, wherein each window includes a boundary including at least one boundary segment, wherein each affected window includes an affected boundary segment that is at least partially disposed within the proximity range, and wherein concurrently moving at least a portion of each affected window includes concurrently moving at least the affected boundary segments of the affected windows.

36. The method of claim 35, wherein concurrently moving at least the affected boundary segments of the affected windows includes moving the affected boundary segments radially with respect to the origin.

37. The method of claim 35, wherein concurrently moving at least the affected boundary segments of the affected windows includes:

(a) moving the affected boundary segments inwardly toward the origin in response to first user input; and (b) moving the affected boundary segments outwardly from the origin in response to second user input.

38. The method of claim 35, wherein concurrently moving at least a portion of each affected window includes moving the affected windows.

39. The method of claim 35, wherein concurrently moving at least the affected boundary segments of the affected windows includes resizing the affected windows by maintaining at least one additional boundary segment in the boundary of each affected window at a fixed location.

40. The method of claim 34, further comprising highlighting the affected windows on the computer display.

41. The method of claim 34, further comprising defining the origin at a location pointed to by the pointer.

42. A computer system, comprising:

(a) a computer display upon which is displayed a plurality of windows and a pointer;

(b) a user input device configured to receive user input; and (c) a processor, coupled to the computer display and the user input device, the processor configured to define as affected windows first and second windows from the plurality of windows, each affected window at least partially disposed within a proximity range defined around an origin located proximate the pointer; and, in response to user input, to concurrently move at least a portion of each affected window in one of an inwardly and an outwardly direction relative to the origin.

43. A program product, comprising:

(a) a program configured to perform a method of manipulating a plurality of windows on a computer display, the method comprising:

(1) displaying a plurality of windows on a computer display;
(2) displaying a pointer on the computer display;
(3) defining as affected windows first and second windows from the plurality of windows, each affected window at least partially disposed within a proximity range defined around an origin located proximate the pointer; and
(4) in response to user input, concurrently moving at least a portion of each affected window in one of an inwardly and an outwardly direction relative to the origin; and (b) a signal bearing media bearing the program.

44. The program product of claim 43, wherein the signal bearing media is transmission type media.

45. The program product of claim 43, wherein the signal bearing media is recordable media.

46. A method of manipulating a plurality of graphical user interface components on a computer display, the method comprising:

(a) displaying a plurality of graphical user interface components on a computer display;
(b) displaying a pointer on the computer display;
(c) defining as affected graphical user interface components first and second graphical user interface components from the plurality of graphical user interface components, each affected graphical user interface component at least partially disposed within a proximity range defined around an origin located proximate the pointer; and
(d) in response to user input, concurrently moving at least a portion of each affected graphical user interface component in one of an inwardly and an outwardly direction relative to the origin.

47. The method of claim 46, wherein the plurality of graphical user interface components includes at least one window.

* * * * *